US011095961B2

(12) United States Patent
Liu et al.

(10) Patent No.: US 11,095,961 B2
(45) Date of Patent: Aug. 17, 2021

(54) REMOTE DATA MULTICASTING AND REMOTE DIRECT MEMORY ACCESS OVER OPTICAL FABRICS

(71) Applicants: Yunqu Liu, Kanata (CA); Kin-Wai Leong, Ottawa (CA)

(72) Inventors: Yunqu Liu, Kanata (CA); Kin-Wai Leong, Ottawa (CA)

(73) Assignee: Viscore Technology Inc., Ontario (CA)

( * ) Notice: Subject to any disclaimer, the term of this patent is extended or adjusted under 35 U.S.C. 154(b) by 0 days.

(21) Appl. No.: 16/928,370

(22) Filed: Jul. 14, 2020

(65) Prior Publication Data

US 2021/0021915 A1 Jan. 21, 2021

Related U.S. Application Data

(60) Provisional application No. 62/873,996, filed on Jul. 15, 2019.

(51) Int. Cl.
*H04Q 11/00* (2006.01)
*H04J 14/02* (2006.01)
*H04L 29/08* (2006.01)

(52) U.S. Cl.
CPC ......... *H04Q 11/0005* (2013.01); *H04J 14/02* (2013.01); *H04L 69/326* (2013.01); *H04J 14/0227* (2013.01); *H04J 2203/0023* (2013.01); *H04J 2203/0053* (2013.01); *H04Q 2011/0015* (2013.01); *H04Q 2011/0016* (2013.01); *H04Q 2011/0047* (2013.01); *H04Q 2011/0052* (2013.01); *H04Q 2011/0058* (2013.01)

(58) Field of Classification Search
USPC .............................................. 398/45, 49–51
See application file for complete search history.

(56) References Cited

U.S. PATENT DOCUMENTS

| 5,541,914 | A | * | 7/1996 | Krishnamoorthy | ... H04L 49/254 370/427 |
|---|---|---|---|---|---|
| 6,542,268 | B1 | * | 4/2003 | Rotolo | ............... H04J 14/0204 369/44.23 |
| 9,894,427 | B2 | * | 2/2018 | Sindhu | ............... H04J 14/0216 |
| 2002/0018263 | A1 | * | 2/2002 | Ge | .................... H04Q 11/0005 398/87 |
| 2002/0071149 | A1 | * | 6/2002 | Xu | ..................... H04J 14/0247 398/5 |
| 2005/0031347 | A1 | * | 2/2005 | Soto | .................. H04B 10/2589 398/58 |

(Continued)

*Primary Examiner* — Li Liu
(74) *Attorney, Agent, or Firm* — Rosenberg, Klein & Lee

(57) ABSTRACT

Today's communications require an effective yet scalable way interconnection of data centers and warehouse scale computers (WSCs) whilst operators must provide a significant portion of data center and WSC applications free of charge to users and consumers. At present, data center operators face the requirement to meet exponentially increasing demand for bandwidth without dramatically increasing the cost and power of the infrastructure employed to satisfy this demand. Simultaneously, consumer expectations of download/upload speeds and latency in accessing content provide additional pressure. Accordingly, the inventors provide a number of optical switching fabrics which reduce the latency and microprocessor loading arising from the prior art Internet Protocol multicasting techniques.

8 Claims, 22 Drawing Sheets

(56) References Cited

U.S. PATENT DOCUMENTS

| | | | |
|---|---|---|---|
| 2008/0298803 A1* | 12/2008 | Warner | H04J 3/1694 398/43 |
| 2009/0142059 A1* | 6/2009 | Chen | H04J 14/0227 398/58 |
| 2010/0119228 A1* | 5/2010 | Zhou | H04B 10/032 398/66 |
| 2010/0254703 A1* | 10/2010 | Kirkpatrick | H04Q 11/0005 398/45 |
| 2011/0164876 A1* | 7/2011 | Fujita | H04J 14/0217 398/48 |
| 2012/0099863 A1* | 4/2012 | Xu | H04Q 11/0005 398/49 |
| 2015/0181317 A1* | 6/2015 | Yin | H04L 49/356 398/45 |
| 2015/0296278 A1* | 10/2015 | Liu | H04Q 11/0062 398/50 |
| 2016/0013864 A1* | 1/2016 | Rafel Porti | H04L 12/2869 398/58 |
| 2017/0019168 A1* | 1/2017 | Menard | H04B 10/071 |
| 2017/0093517 A1* | 3/2017 | Liu | H04L 12/6418 |
| 2018/0070157 A1* | 3/2018 | Menard | G02B 6/3518 |

* cited by examiner

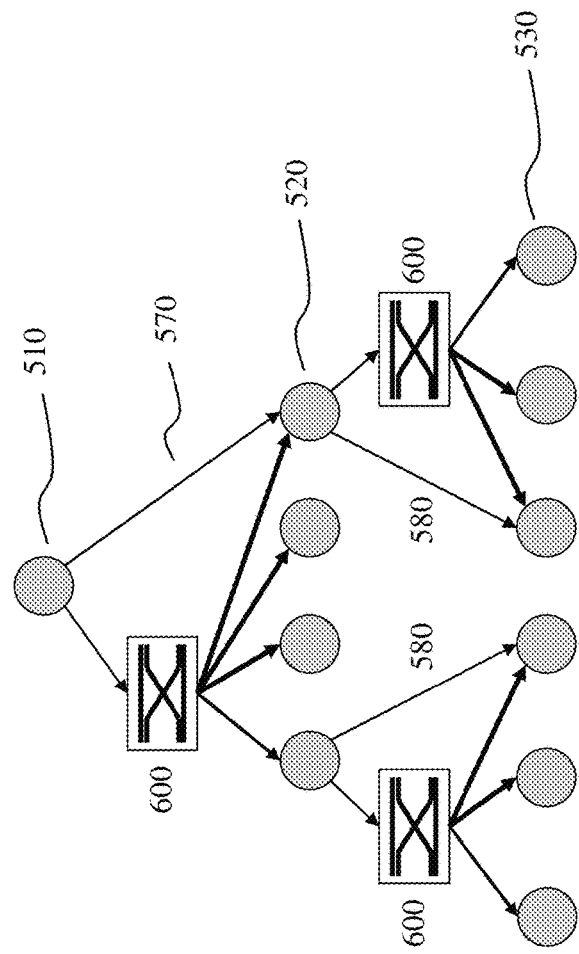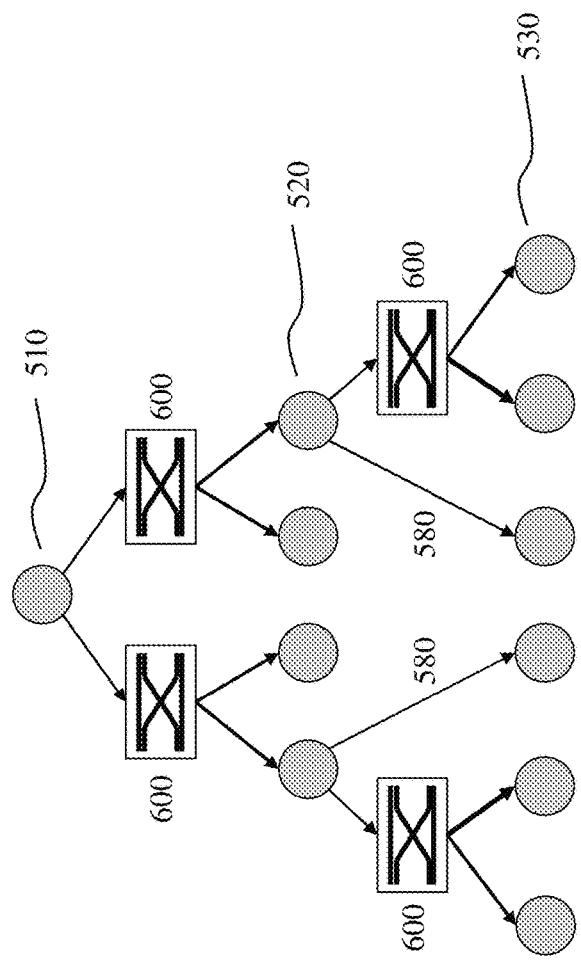
Figure 6A
Figure 6B

| #bytes | Viscore SoftRoCE | | | Open Source SoftRoCE | | | | Hardware RoCE | |
|---|---|---|---|---|---|---|---|---|---|
| | Emulex_VT | Ether_VT | Mlnx_VT | Emulex_Open | Ether_Open | Mlnx_Open | Emulex_HW | Hardware_HW | Mlnx_HW |
| 2 | 10.47 | 4.31 | 4.68 | 15.01 | 10.43 | 7.48 | 6.45 | 1.55 |
| 4 | 10.46 | 4.32 | 4.59 | 15.04 | 9.78 | 7.46 | 6.43 | 1.54 |
| 8 | 10.33 | 4.68 | 4.6 | 15.22 | 9.96 | 7.44 | 6.43 | 1.54 |
| 16 | 10.29 | 4.31 | 4.6 | 15.15 | 9.87 | 7.44 | 6.43 | 1.56 |
| 32 | 10.22 | 4.33 | 4.59 | 15.18 | 9.8 | 7.45 | 6.44 | 1.57 |
| 64 | 10.55 | 4.90 | 4.94 | 15.21 | 9.43 | 7.4 | 6.45 | 1.66 |
| 128 | 10.54 | 4.40 | 5.45 | 15.36 | 9.85 | 7.56 | 6.47 | 1.82 |
| 256 | 10.73 | 4.49 | 5.66 | 15.39 | 9.97 | 8.05 | 7.09 | 2.56 |
| 512 | 11.71 | 5.21 | 6.22 | 15.47 | 16.26 | 7.69 | 7.38 | 2.89 |
| 1024 | 13.17 | 10.92 | 6.87 | 15.48 | 13.44 | 8.22 | 7.98 | 3.59 |
| 2048 | 14.98 | 11.68 | 7.77 | 18.31 | 16.07 | 11.08 | 10.29 | 4.97 |
| 4096 | 20.89 | 14.18 | 10.02 | 23.79 | 21.43 | 14.1 | 12.38 | 6.71 |
| 8192 | 35.75 | 15.75 | 13.79 | 34.27 | 40.37 | 22.13 | 16.56 | 10.16 |
| 16384 | 69.32 | 21.30 | 20.21 | 57.39 | 67.07 | 37.45 | 22.77 | 17.03 |
| 32768 | 110.83 | 42.14 | 37.2 | 104.25 | 124.44 | 68.35 | 37.05 | 30.74 |
| 65536 | 164.49 | 65.75 | 68.25 | 198.04 | 238.96 | 142.51 | 65.51 | 58.18 |
| 8388608 | 19019.35 | 7352.47 | 8136.81 | 27304.29 | 29230.87 | 15959.76 | 7317.24 | 7029.42 |

Figure 14

REMOTE DATA MULTICASTING AND REMOTE DIRECT MEMORY ACCESS OVER OPTICAL FABRICS

CROSS-REFERENCE TO RELATED APPLICATIONS

This application claims the benefit of priority from U.S. Provisional Patent Application 62/873,996 filed Jul. 15, 2019 entitled "Remote Data Multicasting and Remote Direct Memory Access over Optical Fabrics", the entire contents of which are incorporated herein by reference.

FIELD OF THE INVENTION

This invention relates to remote data multicasting and remote direct memory access and more particularly to exploiting optical multicasting, optical cross-connects, and optical fabrics within datacenters and data interconnection networks for low latency communications

BACKGROUND OF THE INVENTION

Data centers are facilities that store and distribute the data on the Internet. With an estimated 14 trillion web pages on over 750 million websites, data centers contain a lot of data. Further, with almost three billion Internet users accessing these websites, including a growing amount of high bandwidth video, there is a massive amount of data being uploaded and downloaded every second on the Internet. At present the compound annual growth rate (CAGR) for global IP traffic between users is between 40% and 50%. In 2015 user traffic averaged approximately 60 petabytes per month ($60 \times 10^{15}$ bytes per month) and is projected to grow approximately 160 petabytes per month in 2020. In 2020 this represents approximately 185 Gb/s user traffic or external traffic over the Internet.

However, the ratios between intra-data center traffic to external traffic over the Internet based on a single simple request being reported as high as a 1000:1 this represents approximately 185 Tb/s internal traffic within the data centers. Further, in many instances there is a requirement for significant replication of content requests from users, e.g. for streaming audiovisual content, leading to multicasting rather than point-to-point (P2P) data communications within the data center. Accordingly, it is evident that a significant portion of communications within a data center relate to multicasting IP data within the data center and to the external users. Even worse is that peak demand will be considerably higher with projections of over 600 million users streaming Internet high-definition video simultaneously at these times.

A data center is filled with tall racks of electronics surrounded by cable racks where data is typically stored on big, fast hard drives. Servers are computers that take requests and move the data using fast switches to access the right hard drives and either write or read the data to the hard drives. In mid-2013 Microsoft stated it had itself over 1 million servers. Connected to these servers are routers that connect the servers to the Internet and therein the user and/or other data centers. At the same time as requiring an effective yet scalable way of interconnecting data centers and warehouse scale computers (WSCs), both internally and to each other, operators must provide a significant portion of data center and WSC applications free of charge to users and consumers, e.g. Internet browsing, searching, etc. Accordingly, data center operators must meet exponentially increasing demands for bandwidth without dramatically increasing the cost and power of the infrastructure. At the same time consumers' expectations of download/upload speeds and latency in accessing content provide additional pressure.

Accordingly, it would be beneficial to identify a means to reduce both the latency and microprocessor loading arising from the prior art IP multicasting techniques.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to remote data multicasting and remote direct memory access and more particularly to exploiting optical multicasting, optical cross-connects, and optical fabrics within datacenters and data interconnection networks for low latency communications.

In accordance with an embodiment of the invention there is provided a method of routing data comprising:
providing a plurality M of first switches, each first switch for coupling to a plurality of electronic devices;
providing a second switch coupled to the plurality M of first switches;
interconnecting the second switch to the plurality M of first switches with a plurality of first optical links;
providing within a predetermined first optical link of the plurality of first optical links a first optical splitter providing a plurality of first outputs, wherein a first output of the plurality of first outputs forms part of the predetermined first optical link of the plurality of first optical links and the remainder of the plurality of first outputs are each coupled to predetermined first switches of the plurality of first switches.

In accordance with an embodiment of the invention there is provided a method comprising:
a first switch for coupling to a plurality of electronic devices comprising a plurality of first ports and a second port, each electronic device comprising a transmit port coupled to a predetermined first port of the first switch and a receive port coupled to a predetermined first port of the first switch; wherein
the plurality of transmit ports from the plurality of electronic devices are connected in parallel to the first switch;
the plurality of receive ports from the plurality of electronic devices are connected in parallel to the first switch; and
the second port of the first switch is coupled to an optical multicast module comprising a plurality of output ports, each output port coupled to a predetermined electronic device.

In accordance with an embodiment of the invention there is provided a network comprising:
a plurality M of first switches, each first switch for coupling to a plurality of electronic devices;
a second switch coupled to the plurality M of first switches;
a plurality of first optical links interconnecting the second switch to the plurality M of first switches; wherein
within a predetermined first optical link of the plurality of first optical links a first optical splitter providing a plurality of first outputs, wherein a first output of the plurality of first outputs forms part of the predetermined first optical link of the plurality of first optical links and the remainder of the plurality of first outputs are each coupled to predetermined first switches of the plurality of first switches.

In accordance with an embodiment of the invention there is provided a network comprising:

a first switch for coupling to a plurality of electronic devices comprising a plurality of first ports and a second port, each electronic device comprising a transmit port coupled to a predetermined first port of the first switch and a receive port coupled to a predetermined first port of the first switch; wherein the plurality of transmit ports from the plurality of electronic devices are connected in parallel to the first switch;

the plurality of receive ports from the plurality of electronic devices are connected in parallel to the first switch; and the second port of the first switch is coupled to an optical multicast module comprising a plurality of output ports, each output port coupled to a predetermined electronic device.

In accordance with an embodiment of the invention there is provided a method of multicasting comprising:

providing a passive optical cross-connect fabric;

providing a set of first nodes, each first node connected to an input port of the passive optical cross-connect fabric and transmitting on a predetermined wavelength of a set of wavelengths;

providing a set of second nodes, each second node connected to an output port of the passive optical cross-connect fabric;

transmitting data from a predetermined subset of the set of first nodes to a predetermined subset of the set of second nodes using a direct memory access protocol; wherein all messages broadcast by each first node of the set of first nodes are broadcast to all second nodes of the set of second nodes.

In accordance with an embodiment of the invention there is provided a multicast fabric comprising:

a passive optical cross-connect fabric;

a set of first nodes, each first node connected to an input port of the passive optical cross-connect fabric and transmitting on a predetermined wavelength of a set of wavelengths;

a set of second nodes, each second node connected to an output port of the passive optical cross-connect fabric; wherein data transmitted from a predetermined subset of the set of first nodes to a predetermined subset of the set of second nodes employs a direct memory access protocol; wherein all messages broadcast by each first node of the set of first nodes are broadcast to all second nodes of the set of second nodes.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 6A and 6B depict logical layouts for NIC P2P according to the embodiment of the invention depicted in FIG. 5;

FIG. 14 depicts a comparison between software remote direct memory access (RDMA) over converged Ethernet (RoCE) according to an embodiment of the invention with prior art software and hardware based RoCE;

DETAILED DESCRIPTION

Figure 1:
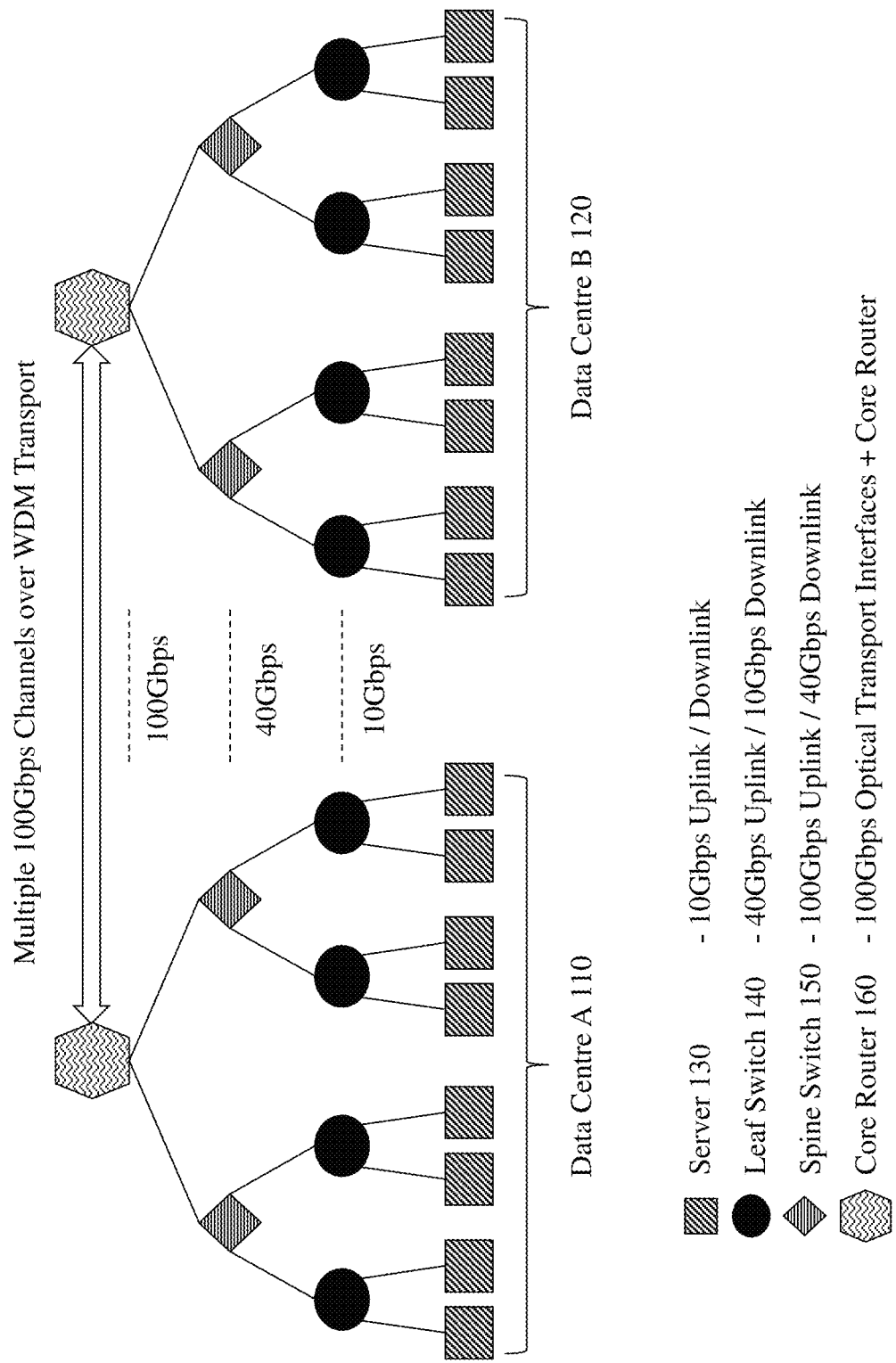
FIG. 1 depicts data center network connections according to the prior art.

The present invention is directed to remote data multicasting and remote direct memory access and more particularly to exploiting optical multicasting, optical cross-connects, and optical fabrics within datacenters and data interconnection networks for low latency communications The ensuing description provides exemplary embodiment(s) only, and is not intended to limit the scope, applicability, or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

Historically, datacenter interconnections for a given customer took the form of a few cross-connects measuring tens of meters within a single datacenter. As needs have arisen for resilient hyperscale datacenters, cross-connects have increased to several hundreds of meters within the datacenter and have been extended to several tens of kilometers across datacenters within the same metropolitan market. At the same time customers today may employ public storage, commonly referred to as Public Cloud, or private storage, known as Private Cloud. Others may exploit a combination of both, Hybrid Cloud, services. Others may employ multiple Public Cloud services in what is known as a Multi-Cloud environment. Others may combine both a Hybrid Cloud and Multi-Cloud service combination, known as Hybrid Multi-Cloud, (HMCloud). Accordingly, new functionalities are required in datacom networks in order to enable the capabilities that are sought for by datacenter customers.

At the same time as supporting increased data flow, increased customer expectations and lower costs, no compromises can be made on the reliability of cloud computing communications that occur inside the datacenter, between datacenters and in the access of datacenters. To achieve what may be considered telecommunications grade resiliency requirements then cloud computing vendors need to consider issues such as geographic failover and load balancing across multiple datacenter facilities within a given metro market.

It thus follows that the most successful datacenters will be those who will also host seamlessly interconnected services from multiple diverse facilities within the same metropolitan market. In the past, it was sufficient to interconnect the datacenter hosted enterprise cloud infrastructure with the one on its premises. However, HM clouds require multipoint connectivity with many more degrees of interconnection to allow multiple cloud providers to reach both the datacenter hosted and the on premise enterprise private datacenter. Further, the accessibility of wavelength division multiplexed (WDM) passive optical network (PON) technology allows links capable of interconnecting HM Clouds to span across multiple datacenters that can be several kilometers apart. Further, fiber optic network operators are now seeking to consolidate multiple smaller points of presence into larger datacenters in order to reduce their operational expenditures.

1. Managing Oversubscription to Control Costs in Two-Tier Leaf-Spine Architectures The majority of hyperscale datacenter networks today are designed around a two-tier leaf/spine Ethernet aggregation topology leveraging very high-density switches such as the one depicted in FIG. 1. Within this two-tier leaf/spine topology, the oversubscription ratio is defined as the ratio of downlink ports to uplink ports when all ports are of equal speed. With 10 Gbps server interfaces, and considering these as part of a 3:1 oversubscribed architecture, then 40 Gbps of uplink bandwidth to the spine switches is necessary for every 12 servers, i.e. 12×10 Gb/s=120 Gb/s downlink bandwidth. The 3:1 threshold today being generally seen as a maximum allowable level of oversubscription and is both carefully understood and managed by the datacenter operators. Accordingly, a 3:1 oversubscribed leaf/spine/core architecture is commonly deployed in order to support communications within and between a pair of data centres, As depicted Data Centre A 110 and Data Centre 120 generally consists of servers 130 interconnected by 10 Gbps links to Top of Rack (ToR) Ethernet switches that act as first level aggregation, the ToR leaf switches 140. These ToR leaf switches 140 then uplink at 40 Gbps into end of row (EoR) Ethernet switches, which act as the spine switches 150 of the leaf/spine topology. As an example, with a 48-port ToR switch of 10 Gbps per port, ensuring a maximum 3:1 oversubscription ratio requires that the ToR switches have 16 uplink ports at 10 Gbps or alternatively, 4 ports at 40 Gbps. Then in order to enable connectivity across datacenters, the spine switches then connect at 100 Gbps to core routers 160, which then in turn interconnect to optical core infrastructure made up metro/long-haul DWDM/ROADMs transport platforms.

Each leaf switch 140 must connect to every spine switch 150 in order to ensure that the network is never oversubscribed at any location beyond the chosen oversubscription threshold. By using such a network topology, and leveraging an equal cost multi-path protocol (ECMP), it is then possible to have an equal amount of bandwidth across the aggregated path between the upstream and downstream thereby providing a non-blocking network architecture via multiple aggregated links. It would be evident that the number of uplinks on the leaf switches 140 limits the number of spine switches 150 to which they can connect whilst the number of downlinks on the spine switches 150 then limits the number of leaf switches 140 that can be part of the overall network.

Consequently, the number of computer servers that can be added to two-tier leaf/spine data center network architecture is a direct function of the number of uplinks on the leaf switches. If a fully non-blocking topology is provided, then the leaf switches are required to have as many uplinks as downlink interfaces to computer servers. Today, 10 Gbps is the default speed of network interfaces of data center servers and hence, with the number of servers required to support the growth of Hybrid/Multi-Cloud services etc. requiring much larger and more centralized data centers, it has become challenging to design non-blocking and cost-effective data center networking fabrics.

Whilst, this leaf/spine/core architecture is the most pervasive manner of providing any-to-any connectivity with a maximum amount of bisection bandwidth within and across data centers it is not without its limitations. One such limitation is latency due to the requirement to route by at least one leaf switch or more typically via two leaf switches and two or more spine switches and/or core routers according to the dimensions of the data center, the uplink capacity, downlink capacity, location(s) of the servers being accessed, etc. Accordingly, within the prior art alternative architectures have been proposed such as chordal networks and spine ring networks. Considering the former then a 32 node chordal ring network is formed from 32 EoR spine switches in a ring wherein each spine switch is addressed from another spine switch by the selection of the wavelength upon which the data is transmitted. Accordingly, there the number of spine switches/core switches traversed may be reduced through Dense Wavelength Division Multiplexing (DWDM) based chordal ring architectures as rather than routing data through multiple spine and/or core switches the data routed from a node based upon wavelength wherein the $N^{th}$ wavelength denotes the $N^{th}$ node around the ring.

Within other prior art developments to address the drawbacks within two-tier leaf-spine networks have included the addition of direct connectivity between spine switches rather than requiring routing via a core router and the provisioning of increased connectivity between leaf switches and spine switches such that each leaf switch is connected to multiple spine switches. However, within data center inter-connection networking scenarios these approaches maintain centralized switching functionality requiring extra network links be traversed, commonly referred to as increasing the number of hops, which in turn increase latency, increase cost, and increase power consumption. Three key factors that cloud data storage providers and data center operators are seeking to lower. Accordingly, it would be evident that solutions to reduce latency and increase effective transmission capacity would be beneficial within data center environments as well as other environments. One such solution is the provisioning of broadcast (or multicast) capabilities within a network such as data center exploiting Internet Protocol (IP) based communication methodologies. Another solution, as will be described subsequently below is the provisioning of intermediate multicast layers to bypass routing to the higher layer spine and core switches.

As noted supra network-intensive applications like networked storage or cluster computing require a network infrastructure which provides a high bandwidth and low latency. Accordingly, systems today send data over a network using the Internet Protocol where data is sent in fixed-length data records, commonly referred to as packets, which comprise a "header" followed by a "data section". To ensure that all the packets that get sent arrive at their destination IP links commonly exploit the Transmission Control Protocol (TCP) which runs on top of IP, and takes care of the overhead processes of making certain that every packet sent arrives and splitting/joining the "continuous stream" of bytes to/from the packets. Accordingly, within data centers exploiting Ethernet links in the prior art TCP/IP is the common link format.

As TCP is a "connection oriented protocol", this means that prior to exploiting it the system must first "establish a connection" with one program taking the role of a "server", and another program taking the role of a "client." The server will wait for connections, and the client will make a connection. Once this connection has been established, data may be sent in both directions reliably until the connection is closed. In order to allow multiple TCP connections to and from a given host, "port" numbers are established. Each TCP packet contains an "origin port" and a "destination port", which is used to determine which program running under which of the system's tasks is to receive the data. This overall identification of an application process through the combination of the IP address of the host it runs on—or the network interface over which it is talking, to be more precise—and the port number which has been assigned to it. This combined address is called a socket.

Internet socket APIs are usually based on the Berkeley sockets standard. In the Berkeley sockets standard different interfaces (send and receive) are used on a socket. In inter-process communication, each end will generally have its own socket, but as these may use different application programming interfaces (APIs) they are abstracted by the network protocol.

In contrast to TCP/IP a datacenter may exploit Remote Direct Memory Access (RDMA) which is a direct memory access from the memory of one computer into that of another without involving either computer's operating system. RDMA permits high-throughput, low-latency networking, which is especially useful in massively parallel computer clusters and typically offers lower latency, lower CPU load and higher bandwidth than TCP/IP. The exploitation of the RDMA over Converged Ethernet (RoCE) protocol allows even lower latencies to be achieved than earlier RDMA protocols.

Accordingly, whilst historically communications links were primarily TCP/IP based with small levels of RDMA supported by the server's NIC the inventors define their links as being primarily RDMA based with small levels of TCP/IP supported by the server's NIC. A small levels of TCP/IP communications remains as not all communications from a server within a datacenter will be direct transfer to another server within a datacenter as overall management functions and some data transfers will be to an application through a socket. Exploiting RoCE for the RDMA processes allows communication between any two hosts within the same Ethernet broadcast domain.

Figure 2:
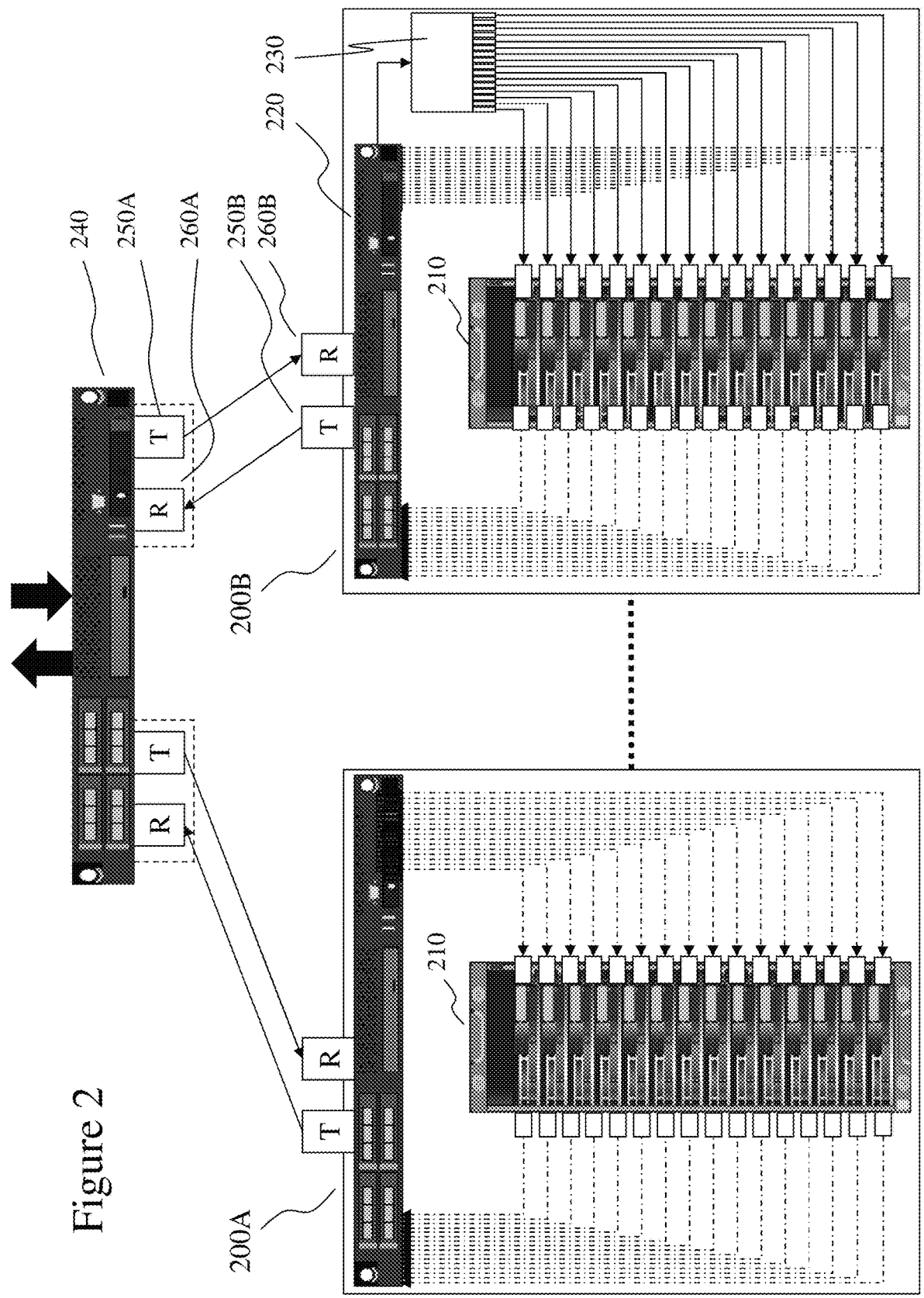
FIG. 2 depicts a software-defined RDMA over Converged Ethernet (RoCE) multicasting architecture for downstream multicasting within a rack or in-between racks according to an embodiment of the invention.

Accordingly, referring to FIG. 2 there is depicted a software defined RDMA multicast within a rack and in-between racks according to an embodiment of the invention. Accordingly, there are depicted first and second racks 200A and 200B each comprising an array 210 of 16 servers in conjunction with a Top-of-Rack leaf switch (ToR-LS) 220. Each ToR-LS 220 is coupled to an End-of-Row (EoR) switch (ER-SW) 240 via dedicated links such that the ER-SW 240 has a first transmitter (Tx) 250A and first receiver (Rx) 260A assigned to each ToR-LS 220 which itself has a second Tx 250B and second Rx 260B. As depicted in first rack 200A the ToR-LS 220 communicates with each server (not identified for clarity) via a dedicated downlink and dedicated uplink as known within the prior art. According, in the event of a multi-cast (MC) message being transmitted by a server within first rack 200A this is received at the ToR-LS 220 wherein it is both transmitted to the ER-SW 240 via an RoCE transmission and to each server within the first rack 200A. As the first rack 200A exploits dedicated downstream links then ToR-LS 220 employs a software based RoCE process to replicate the MC message and provide it into the memory of each server within the first rack 200A over the dedicated link to each server. Accordingly, the Soft-RoCE is performed by the ToR-LS 220. Similarly, ER-SW 240 executes a Soft-RoCE process for the received MC message to replicate and transmit the MC message to each ToR-LS 220 of the other racks it is coupled to via optical links.

In contrast, second rack 200B similarly exploits dedicated upstream links from each server to the ToR-LS 220 and a series of dedicated downstream links but it provides for an overlay optical MC via MC transmitter 230 and links to each server within the rack 210 of second rack 200B. Accordingly, the ToR-LS 220 upon receiving an MC message rather than transmitting this to each server via a software replication process with RDMA (e.g. software-defined RDMA) provides this to the MC transmitter 230 wherein it generates an optical MC message which is passively split and coupled to each server. Accordingly, it would be evident that a range of options exist for providing the MC message in conjunction with the non-MC messages provided from the ToR-LS 220. These include, but are not limited to:

defining a time-slot for MC messages so that the MC transmitter 230 occupies a time-slot or time-slots without conflicting non-MC messages wherein the MC transmitter may operate in the same wavelength band as the non-LC messages;

the MC messages may be upon a separate wavelength with separate receiver within each server coupled via different routing between ToR-LS 220 and MC transmitter 230; and the MC messages may be upon a separate wavelength with separate receiver within each server multiplexed over common path from the ToR-LS 220.

Figure 3A:
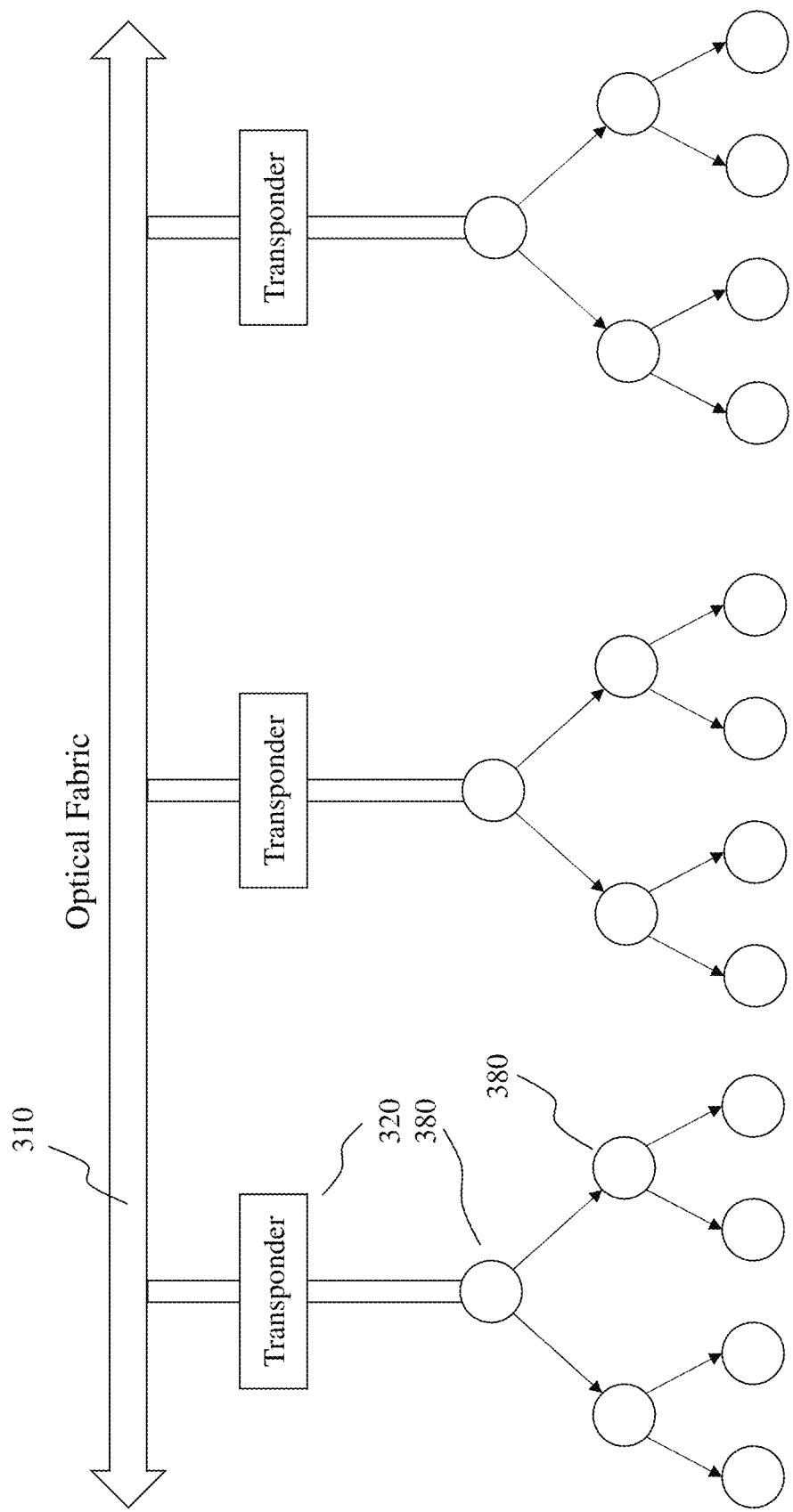
FIGS. 3A and 3B depict a logical layout for an offload multicast methodology for use within a rack or in-between racks according to an embodiment of the invention.

Now referring to FIG. 3A there is depicted a logical layout for an offload multicast methodology for use within a rack or in-between racks according to an embodiment of the invention. Accordingly, as depicted a plurality of nodes 380 are connected in a tree to a transponder 320. Each transponder 320 being connected to an optical fabric 310. Accordingly, the optical fabric 310 and transponders 320 provide connectivity, what the inventors refer to as a Hyper Edge connectivity, between racks whilst the nodes, e.g. servers within a rack, are connected in a binomial multicast configuration within a rack. The Hyper Edge provides for an offloading of the multicast between racks. This is achievable as concepts such as Multicast Service Function Tree (MSFT) are flexible enough to support a software/hardware hybrid solution for multicasting. Within other embodiments of the invention the ToR switch within each rack may also support 1:N or K"N lossy multicast.

Figure 3B:
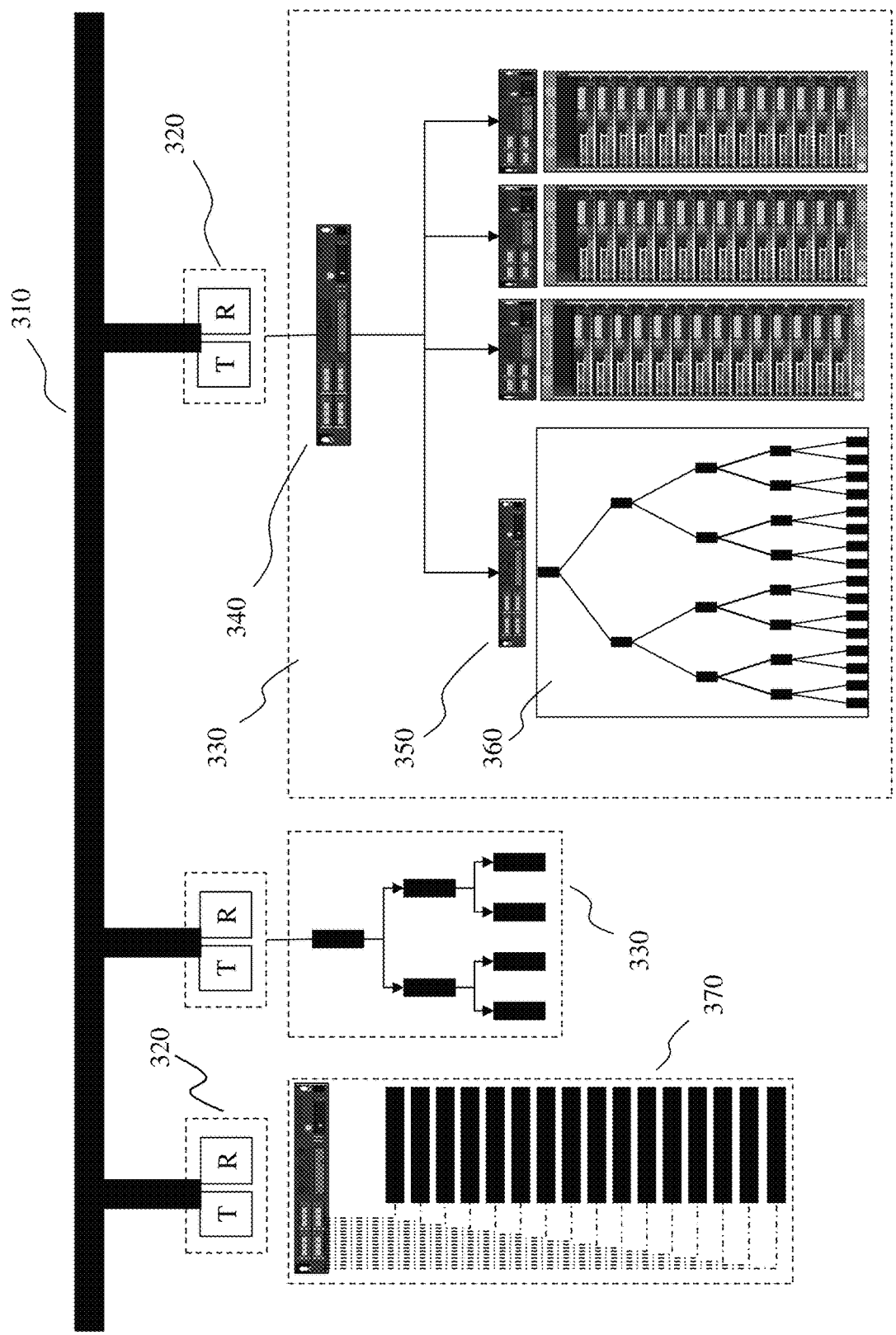

Referring to FIG. 3B there is depicted a logical layout for an offload multicast methodology for use within a rack or in-between racks according to an embodiment of the invention. As depicted an optical fabric 310 coupled to a plurality of transponders 320 each coupled to rack assembly 330. Within the rack assembly 330 is a SP-SW 340 which is coupled to a plurality of ToR-LS 350 each of which is coupled to a plurality of servers within first rack 360. The servers (not identified for clarity) are depicted within a binary tree configuration with respect to the ToR-LS 350 rather than being in parallel through discrete connections to the ToR-LS 350 such as depicted in second rack 370. The optical fabric 310 couples each optical transmitter within the transponders 320 to each optical receiver within the transponders 320.

Accordingly, the offload multicast methodology according to an embodiment of the invention exploits a plurality of transponders, an optical fabric and software installed upon all servers. The transponders are linked to existing commodity ToR switches, for example with a 10 Gb/s port for outgoing data and multiple 10 Gb/s ports for incoming multicast. The servers send the outgoing multicast package to a transponder via Transmission Control Protocol (TCP). The transponders send multicast traffic to all other racks through the "lossless" optical fabric. Accordingly, data packages are copied multiple times through the optical fabric, e.g. 24 or 32 times to each other rack. The transponders within the receiving racks pick the data packages for that rack which are then sent to the servers via TCP links. Each server directly manages the binomial copy to the remainder of the servers. Optionally, if the ToR supports lossy multicast then the transponder can also employ that to send packages to servers, and use Negative Acknowledgement (NACK) and TCP to deliver missed packages Within a rack the performance is limited by the ToR and the binomial algorithm. Between racks the hardware according to an embodiment of the invention such as described and depicted in FIGS. 3A and 3B enable a one-to-all copy for all other racks, e.g. 24 or 32 racks, within a timeframe of approximately 200 ns. However, these will be delayed by factors such as buffering. The lossy ToR hardware multicast is beneficial where the loss ratio is predictably low.

In the scenario where a package is sent from one server to all then it sends the package via TCP through the ToR to the transponder, which typically takes less than 1 µs. Then, the optical fiber copies this to all other transponders, that takes less than 200 ns. Next, the transponder uses the ToR to do lossy copy, which typically takes less than another 1 µs. Accordingly, it is evident that the architecture depicted within FIGS. 3A and 3B results in a package being transmitted to any subset of servers or all servers in well under the typical figure of 8 µs typical server clusters achieve today with prior art solutions.

Within embodiments of the invention the number of drop ports, N, may be greater than 1 as the architecture enables multiple multicast. Accordingly, more than one of the transponders can send large data objects (objects) at the line rate to all transponders. These transponders are capable to take them all and then aggregate the data packages to the output N ports. These are then sent via the ToR to the target servers via TCP or lossy User Datagram Protocol (UDP). This can be beneficial in a first scenario where the rack has only one receiving group for the same package wherein the transponder can use all N ports to copy the same package to N sub-groups of servers. It would also be beneficial where the rack has N receiving groups for different packages as the transponder can send to them all via different port simultaneously.

The alternative to multicast is point-to-point (P2P). When considering P2P then it is a pure software solution offering reasonable performance. However, it takes almost the whole network to do that one job, Even, with 2:1 over-provisioning the performance is still non-deterministic and poor even though the cost of the network has doubled. For large numbers of nodes, the statistical fluctuations can be totally out of control and drive the performance to be very poor.

Figure 4:
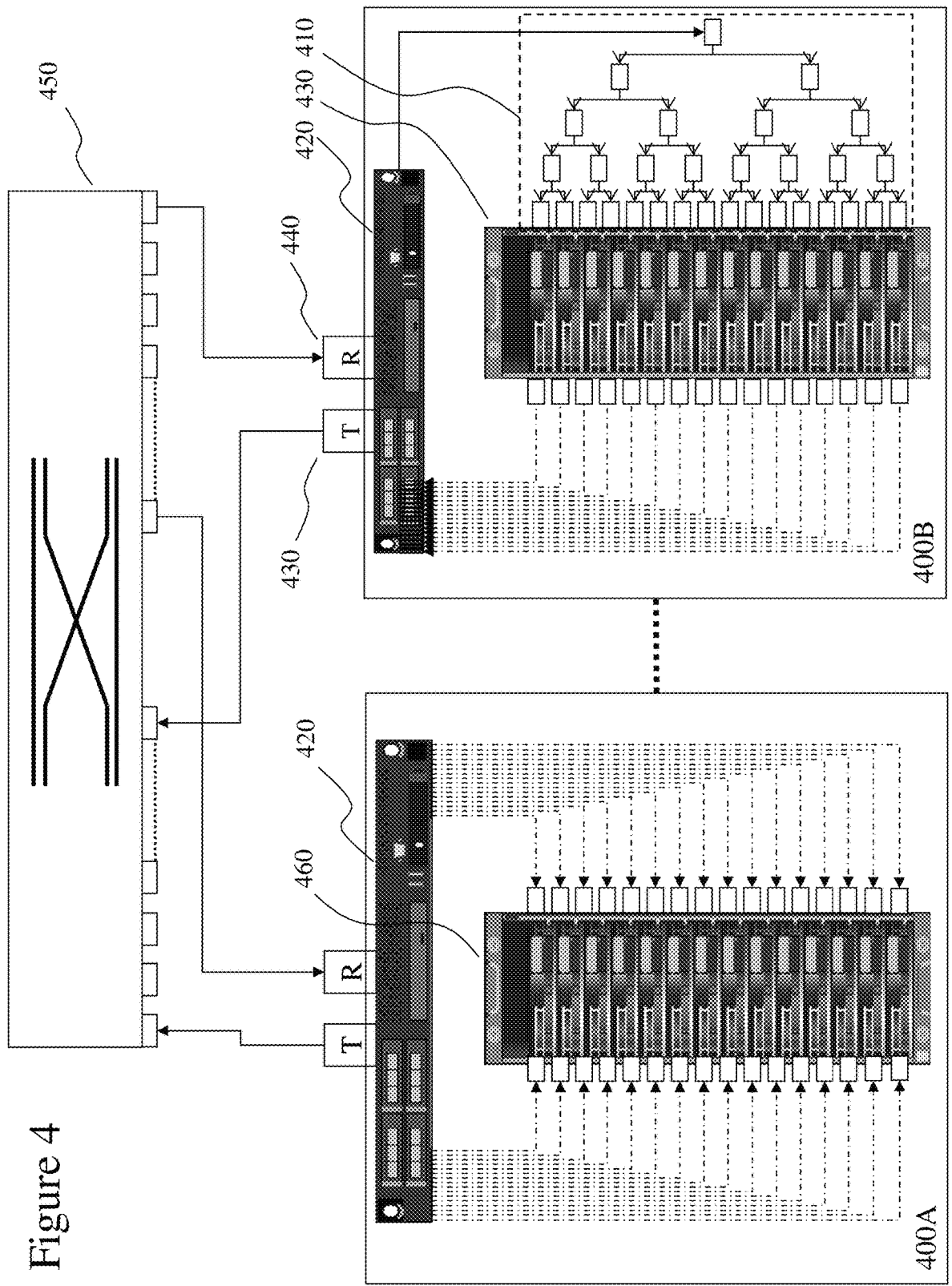
FIG. 4 depicts a physical implementation of the offload multicast methodology according to an embodiment of the invention depicted in FIG. 3.

The server factor makes the value proposition of multicast more compelling. Within a P2P based multicast, all servers in the tree are either occupied or wasted. With a fully blocked network interface card (NIC) how can a server transmit. Adding additional NICs as noted above has significant cost impacts but does not solve the problem and is a major impact on costs versus the addition of more ToR/Spine switches. Accordingly, the embodiments of the invention provide benefits to operators including, for example, low latency and uneven (much higher) receiving bandwidth, reduced cost, reduced power consumption, and compatibility with the current network FIG. 4 depicts a physical implementation of the offload multicast methodology according to an embodiment of the invention depicted in FIG. 3. As depicted first and second racks 400A and 400B respectively are coupled to optical fabric 450 via transmitters 430 and receivers 440, respectively. As depicted first rack 400A comprises a ToR-LS 420 with rack 460 wherein the servers (not identified discretely for clarity) are connected to the ToR-LS 420 via discrete transmit and receive channels in parallel. In second rack 400A the ToR-LS 420 is again coupled to the discrete servers within the rack 430 via discrete channels on the transmit side to ToR-LS 420. However, on the receive side of the servers they are connected from the ToR-LS 420 via an optical multicast network 410 as opposed to discrete parallel channels and/or parallel MC multicast such as depicted in respect of FIG. 3.

Figure 5A:
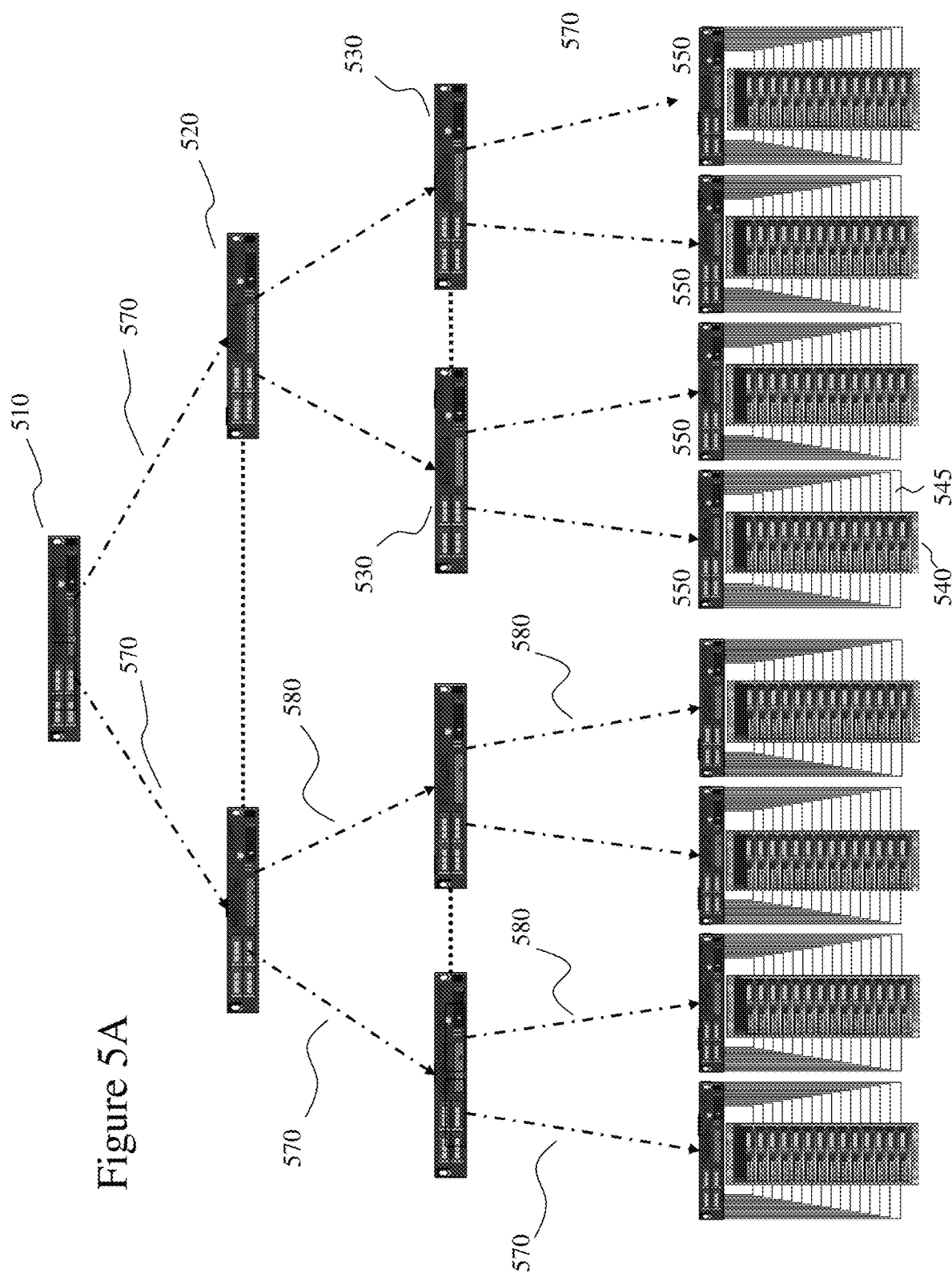
FIGS. 5A to 5C depict network interface controllers (NIC) P2P with in-rack multicast according to an embodiment of the invention.

Referring to FIG. 5A there is depicted a network topology prior to deploying a network interface controller (NIC) P2P with in-rack multicast according to an embodiment of the invention. As depicted a plurality of server racks 540 are coupled to ToR-LS 550 via discrete channels 545. Each ToR-LS 550 is coupled to an EoR-SW 530 (or spline switch) which are in turn coupled to core switches (COR-SW) 520 and network router (NET-R) 510. Links between tiers of the hierarchy are via dedicated links with bandwidths in upstream/downstream and number of subsidiary elements in lower tier to an element in higher tier are defined by the subscription ratio. These links are differentiated between inner links 580 and outer links 570.

Figure 5B:
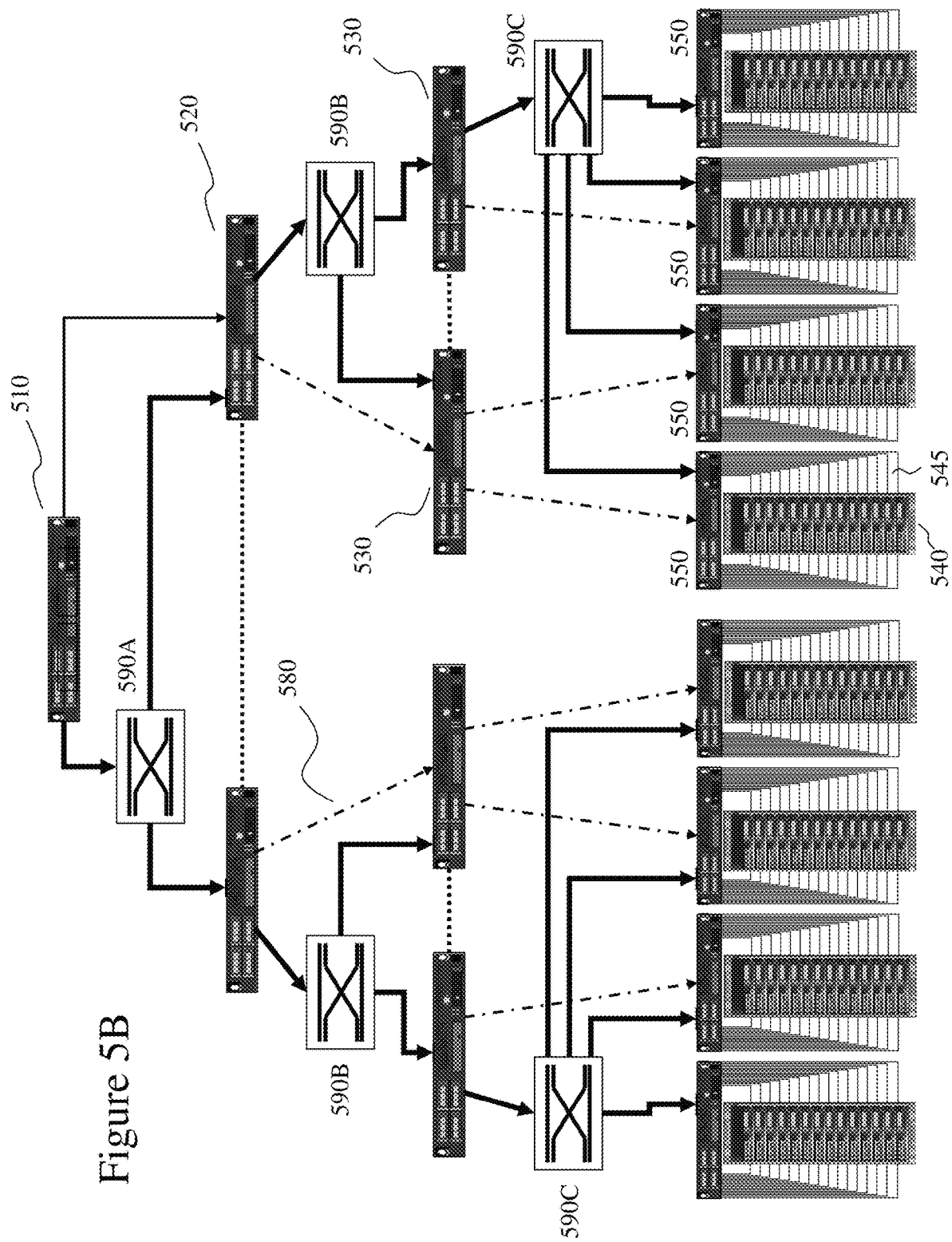
Figure 5C:
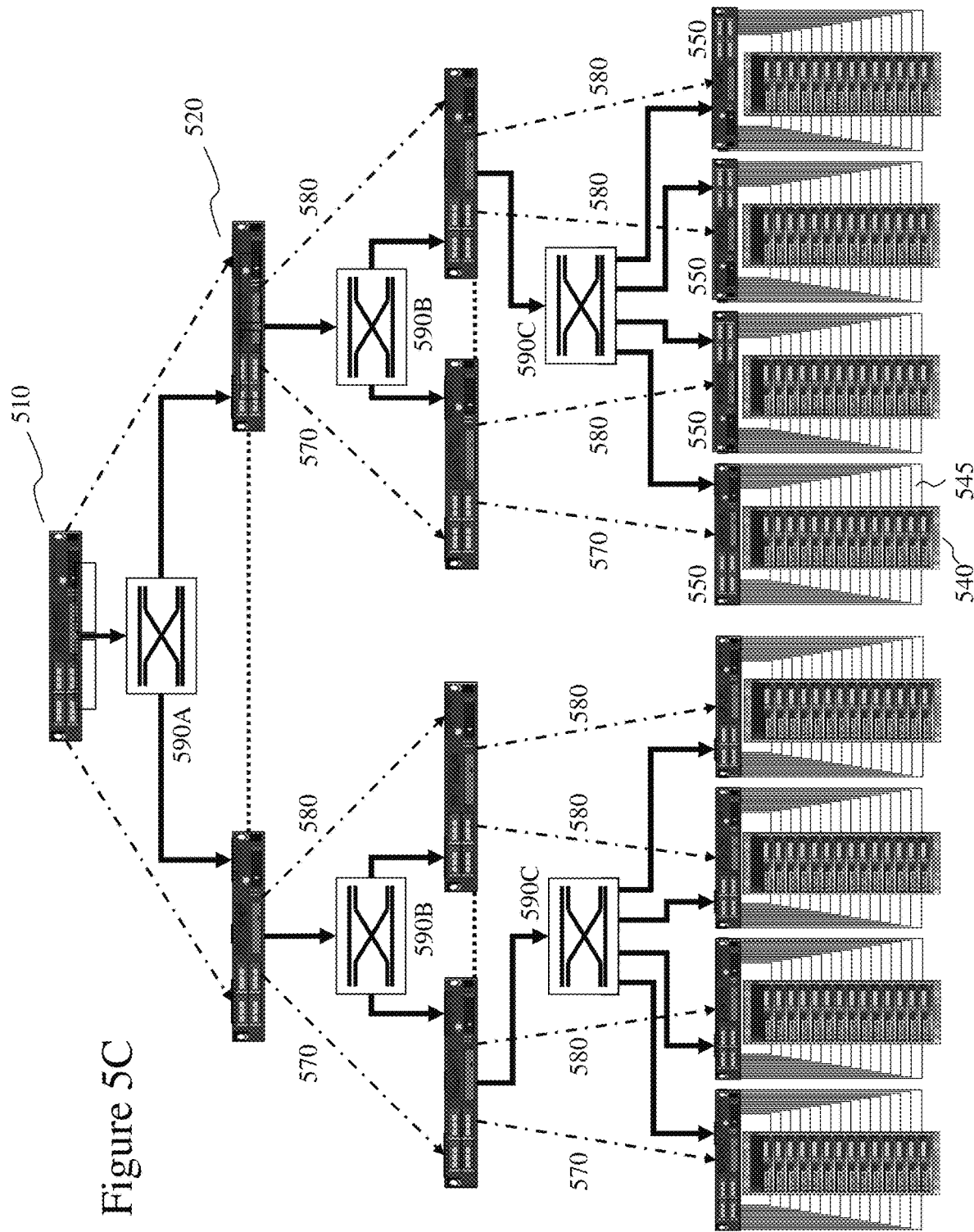

Now referring to FIG. 5B the network topology depicted in FIG. 5A is repeated but now each outer link 570 has been replaced with a multicast network (MC-NET). Accordingly, the outer link 580 between NET-R 510 and COR-SW 520 is replaced by first MC-NET 590A, the outer link 580 between the COR-SW 520 and EoR-SW 530 is replaced by second MC-NET 590B, and the outer link 580 between the EoR-SW 520 and ToR-SW 550 is replaced by third MC-NET 590C. Each of the first MC-NET 590A, second MC-NET 590B, and third MC-NET 590C accordingly multicasts the signal from the higher level to all corresponding elements in the lower tier. Within FIG. 5C the network topology is depicted within another variant to that depicted in FIG. 5B wherein the first MR-NET 590A, second MR-NET 590B and third MR-NET 590C are depicted disposed between their respective tiers within the network but not rather than replacing the outer links 570 they are depicted disposed in addition to the outer links 570 and inner links 580.

Referring to FIGS. 6A and 6B there are depicted logical layouts for NIC P2P according to the embodiment of the invention as depicted in FIG. 5B and a variant thereof. Within FIG. 6A the NET-R 510, COR-SW 520, and EoR-SW 530 are depicted within their tiers with the outer links 570 and inner links 580. Each outer link 570, except that between NET-R 510 and COR-SW 520 has all outer links 580 replaced with MC-NET 600 which connect to each element within the lower tier including the element coupled to the higher tier via an inner link 580. The logical network in FIG. 6B is essentially the same as that depicted in FIG. 6A with the exception that those elements within the lower tier connected to an element within the upper tier via an upper link 580 are not connected to an MC-NET 600 whereas all other elements in the lower tier are connected to the MC-NET 600.

Figure 7A:
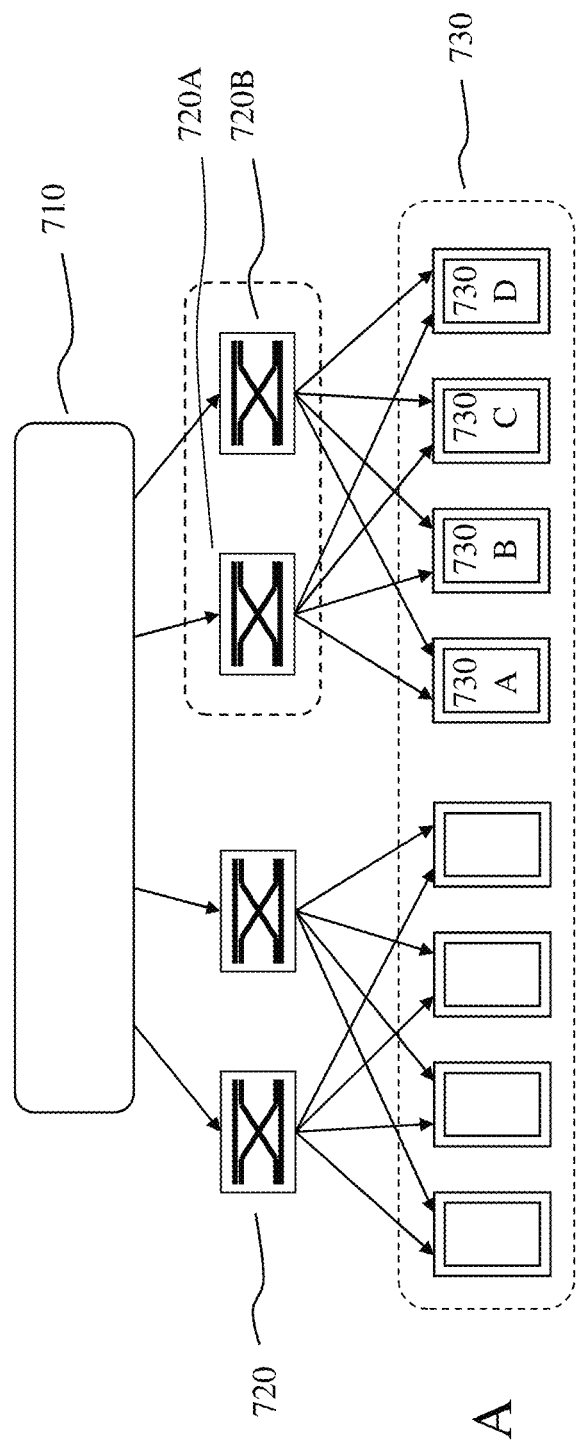
FIGS. 7A and 7B depict physical layouts for NIC P2P according to the embodiment of the invention depicted in FIG. 5.
Figure 7B:
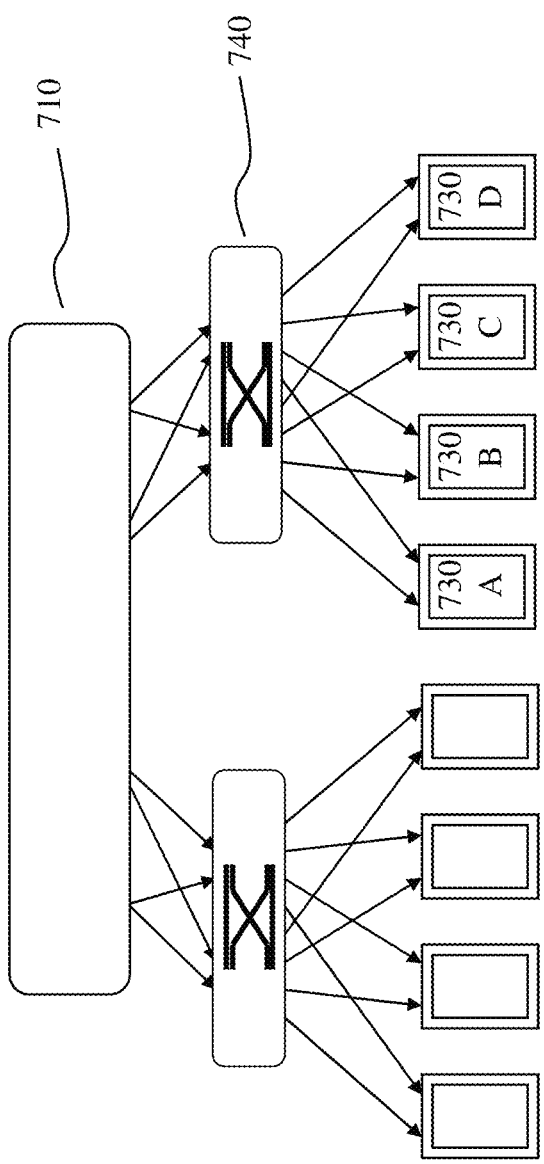

Now referring to FIGS. 7A and 7B there are depicted physical layouts for NIC P2P according to the embodiment of the invention depicted in FIG. 5. In FIG. 7A an upper layer 710 is coupled to a lower layer 730 via a plurality of MC-NETs 720 which are grouped in dependence upon their port counts. As depicted first and second MC-NETs 720A and 720B are coupled to first to fourth rack arrays 730A to 730D respectively wherein each of the first and second MC-NETs 720A and 720B are connected to all of the first to fourth rack arrays 730A to 730D, respectively. In contrast in FIG. 7B multiple MC-NETs 720 are replaced with a larger MC-NET 740.

With respect to the performance of the exemplary embodiments of the invention depicted in FIGS. 3A to 7B there is still the issue of performance at massive scale as potentially bottlenecks will be caused by delays in the receivers setting up to receive the next message in. For example, consider a network with a million nodes. If even one is not ready to receive the next packet, then the whole cluster waits because the sender cannot send until the "ready" bit aggregates and is visible to the NIC. So, this ultimately becomes the limiting factor. Accordingly, it would be beneficial to ensure that the receivers are aware of the full transfer so that they can loop receiving and do not have to set up separately on or for each request.

Further, it would be beneficial to use fixed block sizes, particularly fairly large blocks, with multiples of a page and to page align them. Whilst the receivers do not care where the data appears in memory, as they just want the pages, it would be beneficial to remap them in order to make them contiguous in the application. Further, it would be beneficial for the network to support multiple concurrent senders for different distinct uses so that when, rather than if, a cluster is delayed for transfer A, transfer B is also underway, and on average the network is active and busy. A special case exists for small transfers, unlike video for example which has huge streams of data at steady speeds, such as real-time "events" which are often encoded in data objects that might be just 16 or 32 bytes, but the event rate could be massive.

Figure 8:
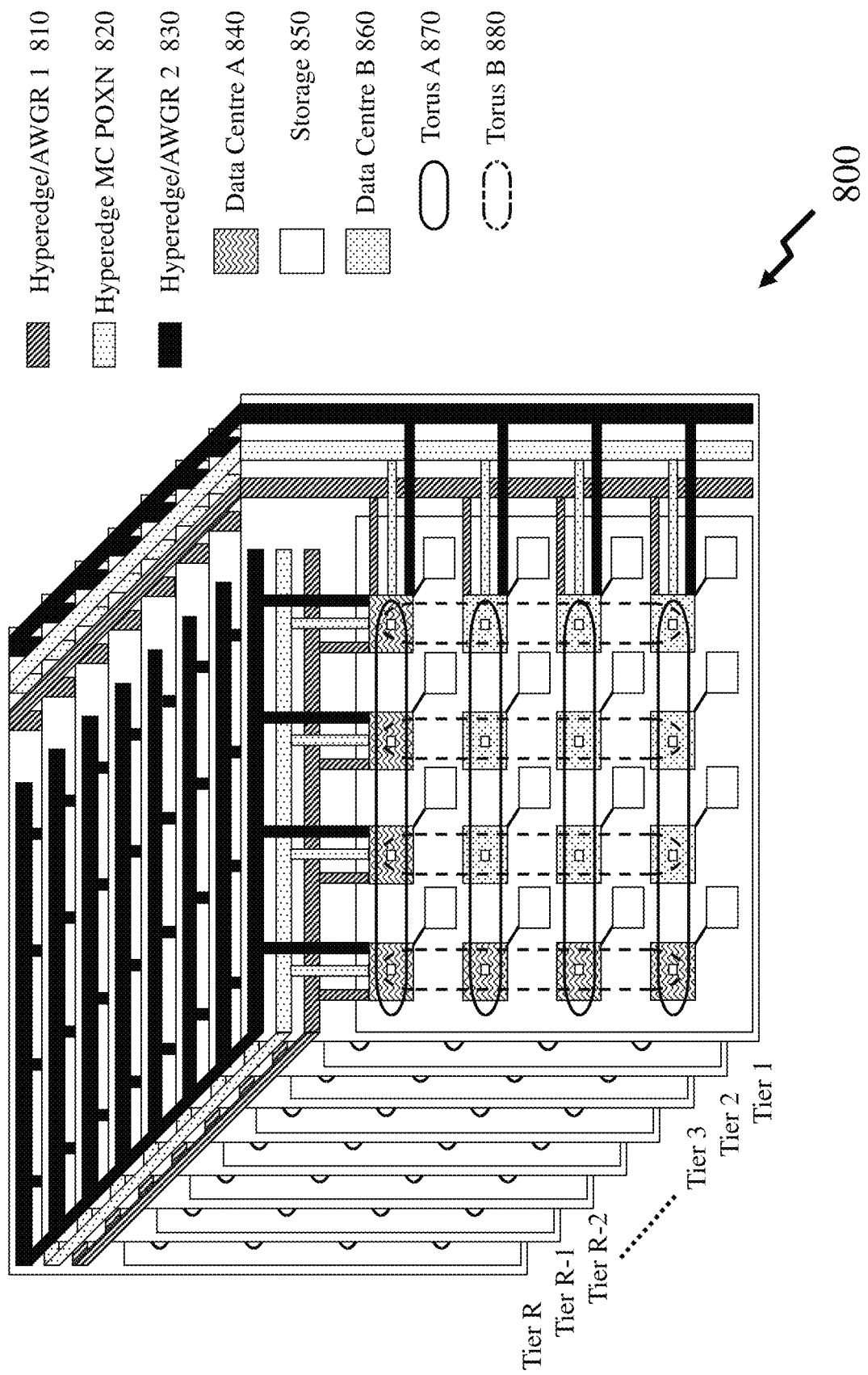
FIGS. 8 and 9 depict schematically data center interconnection configurations according to embodiments of the invention wherein data centers exploit optical multicasting for multicast TCP IP communications within a three-dimensional (3D) architecture.

Now referring to FIG. 8 there is depicted schematically a data center interconnection configuration 800 according to an embodiment of the invention wherein data centers exploit optical multicasting for multicast communications. Accordingly, the configuration employs arrays of data centers, Data Center A 440 and Data Center B 460, each having memory and storage, associated with it wherein these data center arrays each represent one tier of R tiers. Within each tier data centers are connected through Torus A 870 and/or Torus B 880 although they may optionally include portions of first Data PDXN (Hyperedge/AWGR 1) 810 and/or second Data PDXN (Hyperedge/AWGR 2) 830 along that tier's edge. Data centers across multiple tiers are connected through Torus A 870 and/or Torus B 880 in conjunction with the first Data PDXN (Hyperedge/AWGR 1) 810 and/or second Data PDXN (Hyperedge/AWGR 2) 830. However, there are now depicted a pair of Hyperedge MC PDXNs 820 which are coupled to two edges of each tier in common with first Data PDXN (Hyperedge/AWGR 1) 810 and second Data PDXN (Hyperedge/AWGR 2) 830. As such each data center may now exploit the low latency optical multicast methodology such as described supra in respect of FIGS. 3 to 7B respectively in order to provide multicast data communications to multiple data centers within the three-dimensional (3D) array of data centers.

In common with the embodiments of the invention described supra in respect of FIGS. 3 to 7B the optical multicast through the Hyperedge MC PDXN 820 is coupled to the data centers on an outer edge of edge tier. It would be evident that rather than data centers that each of Data Center A 440 and Data Center B 450 may be a cluster of racks, a row of racks, a discrete rack, or variants thereof as well as complete datacenters or discrete servers and accordingly a ToR-LS, an EoR-SW, a COR-SW, or a NET-R. It would also be evident that other configurations of data centers within each plane of the three-dimensional (3D) array of data centers may be employed without departing from the scope of the invention. For example, a hexagonal configuration may be employed with optical multicast along three faces of the 3D array or a single optical multicast may be deployed axially to all tiers wherein within a tier multiple tori are employed.

Figure 9:
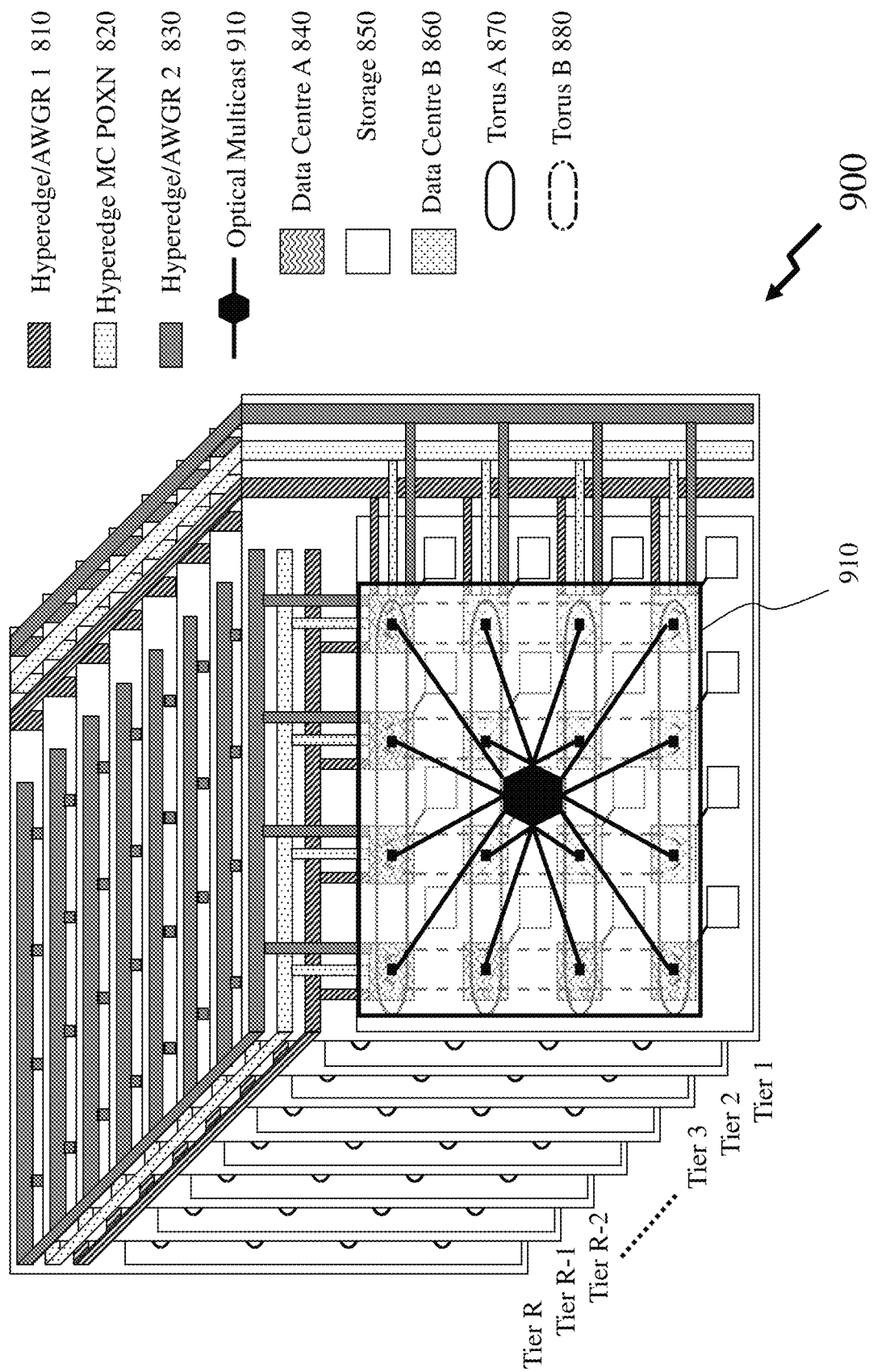

Now referring to FIG. 9 there is depicted schematically a data center interconnection configuration 900 according to an embodiment of the invention wherein data centers exploit optical multicasting for multicast communications. Accordingly, configuration 900 comprises the same architecture and architectural elements as configuration 800 in FIG. 8 but now an optical multicast network 910 interconnects all data centers, e.g. Data Center A 440 and Data Center B 460, within a single tier.

It would be evident that with respect to FIGS. 8 and 9 that alternatively rather than considering each tier as comprising an array of data centers that the elements of Data Center A 440 and Data Center B 460 may alternatively represent EoR or ToR switches within a single data center and that the tiers may represent different data centers and/or different regions within a common single data center.

According to embodiments of the invention whilst a single layer optical multicast is depicted it would be evident that through the use of distributed optical amplification multi-tier optical multicasting may be employed for optical multicasting within a data center. For example, an initial 32-way multicast layer to ToR-LS switches may be followed by a second tier 16-way multicast layer to the servers within the rack. Such multi-tier multicasting may be achieved within a multi-tier architecture by associating, for example, an input and output port of an MC-NET disposed between the ToR-LS and EoR-LS to the COR-SW above such that latency through the EoR-LS is removed.

Whilst within the embodiments of the invention described supra the MC-NETs are disposed within the outer links it would be evident that alternatively the MC-NETs may be coupled to a predetermined inner link within each set of links between a lower tier and a higher tier.

Figure 10A:
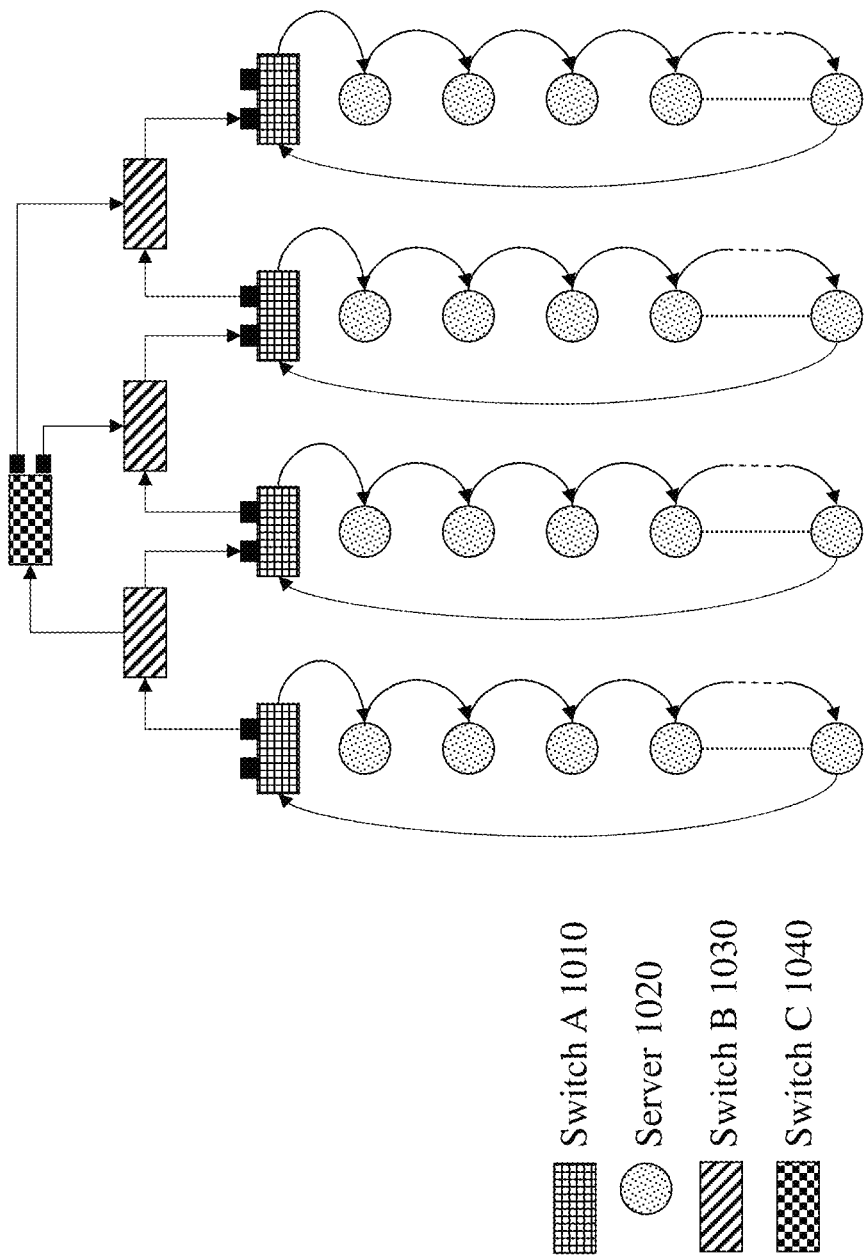
FIG. 10A depicts schematically the multicasting of large data objects within a data center according to the prior art.

Now referring to FIG. 10A there is depicted schematically the multicasting of large data objects within a data center according to the prior art. Accordingly, with a rack a plurality of servers 1020 are disposed connected in "daisy-chain" configuration to a Switch A 1010, e.g. ToR server. The Switches A 1010 are connected to first level of switches, Switch B 1020, which route communications from one rack to another. A second level of switches, Switch C 1030, route communications between the first level of switches. However, when a server 1020 wishes to replicate a software load across a data center, for example, then TCP/IP is inefficient and accordingly RDMA could be used. RDMA deposits directly in memory whilst RDMA over Ethernet does it over a network. With RDMA over Ethernet the distributed storage results in higher Input/Output Operations Per Second (IOPS) versus TCP/IP. A chained software replication is employed as software multicasting is inefficient due to cascaded packet loss.

Accordingly, the inventors have addressed this problem by leveraging:
high performance software RDMA on standard NIC to provide an easy entry point for customers to provide low latency close to hardware solutions
maintaining the data in the user space which hardware solutions do not; and
employing an optical overlay using a second standard NIC in each server.

This approach allows for future enhancements through higher performance NICs and/or enhanced optics.

Figure 10B:
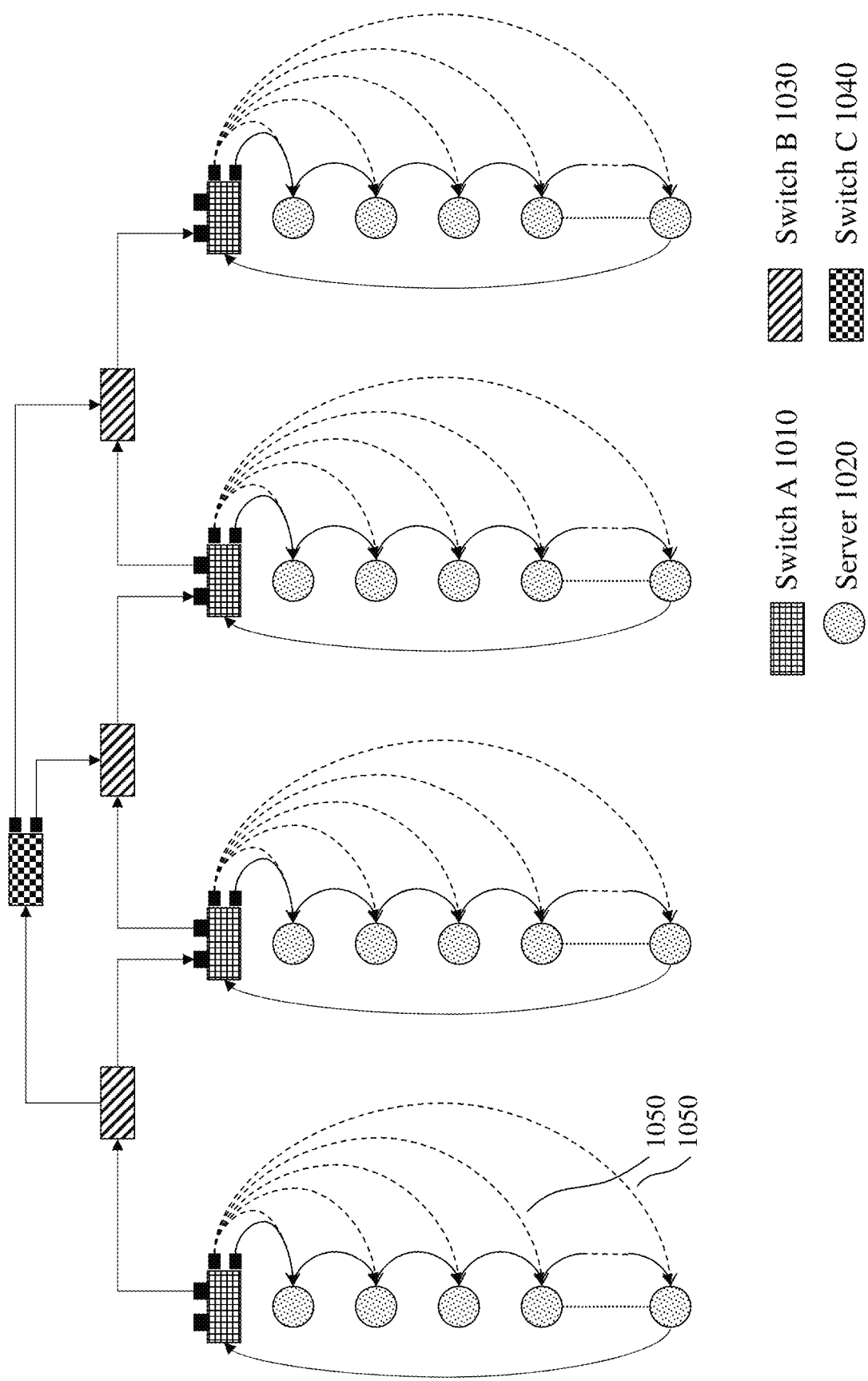
FIG. 10B depicts schematically the multicasting of large data objects within a data center according to an embodiment of the invention.
Figure 10C:
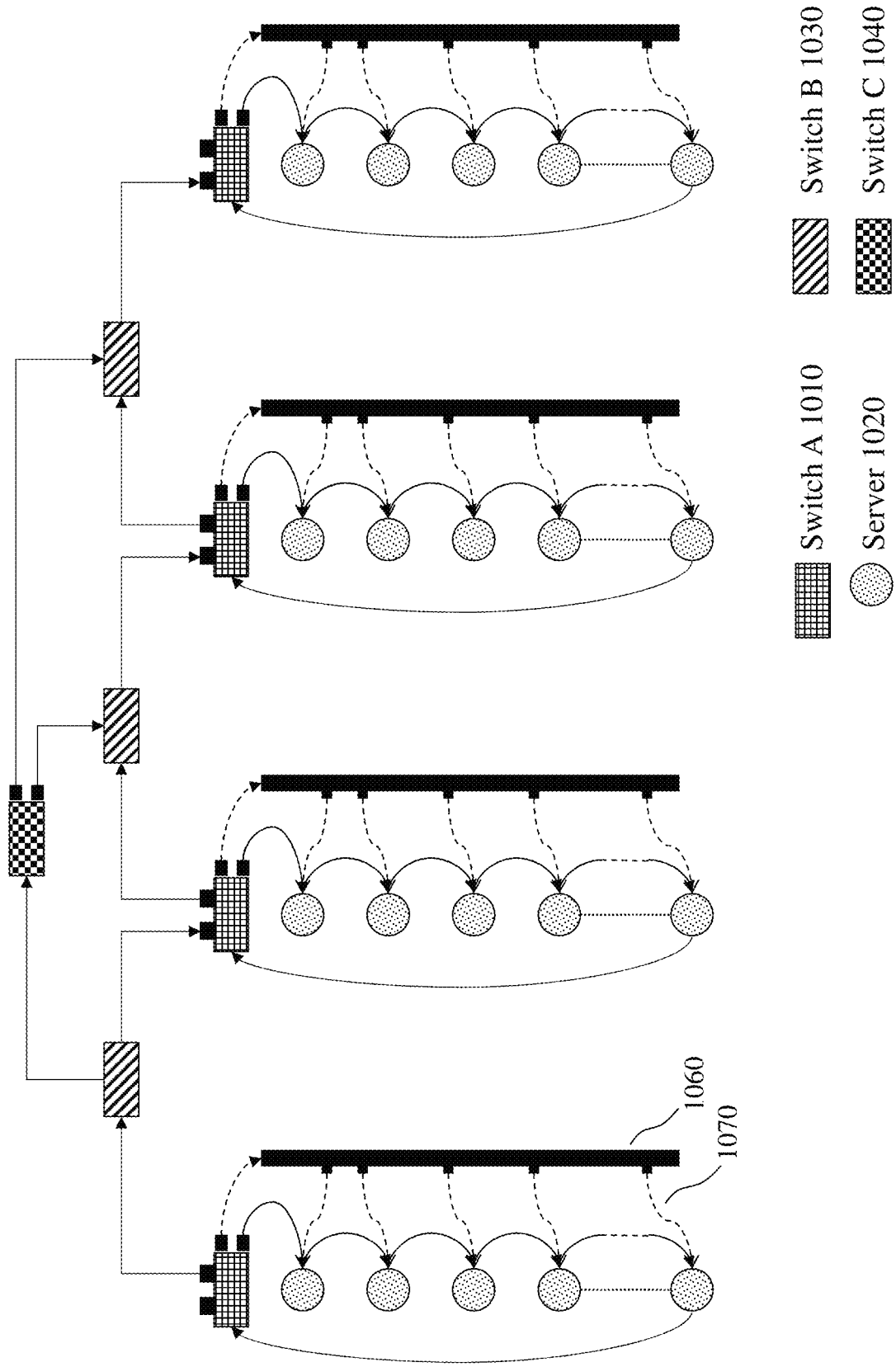
FIG. 10C depicts schematically the multicasting of large data objects within a data center according to an embodiment of the invention.

Now referring to FIG. 10B there is depicted schematically the multicasting of large data objects within a data center according to an embodiment of the invention employing an optical splitter to distribute signals from the ToR Switch, Switch A 1010, via optical fibers 1050 to an additional NIC added to each server 1020. Alternatively, as depicted in FIG. 10C there is depicted schematically the multicasting of large data objects within a data center according to an embodiment of the invention using an optical bus 1060 with optical links 1070 from the optical bus 1060 to the additional NICs within the servers 1020.

2. RDMA Over Passive Optical Cross-Connect Fabric

Within the preceding discussion in respect of FIGS. 2 to 9 and FIGS. 10B and 10C the discussions and analysis have been directed to data centers and the connectivity of servers within racks and between racks. Within these an additional optical fabric is employed to distribute data in order to reduce the latency of the communications between racks etc. Multicast, or more specifically reliable multicast, is an important communication primitive and building block in the architecture of scalable distributed systems. However, implementing reliable multicast at large scale has to date been challenging due to limitations with existing switch fabrics and transport-layer protocols. These switch fabrics and transport-layer protocols are primarily designed for point-to-point (unicast) communications, which have insufficient permutations to support low loss-ratio multicast. So, in practice, to date reliable multicast communications are implemented as a software overlay on top of the unicast network.

Multicast communications consume significant resources which scale nonlinearly with the number of endpoint nodes, often requiring implementations to make trade-offs between latency, reliability guarantees, and scalability. For example, multicast applications can range diversely from live multimedia events which are broadcast to many subscribers (nodes), potentially millions of subscribers, in which strict reliability is not a critical requirement, but timeliness is, to distributed file systems where real-time performance is less critical, but data integrity is. However, many applications such as distributed computing are time-sensitive applications in cloud computing and other distributed systems requiring both high availability, strong consistency, and low latency. These emerging applications being fueled by new technologies like Network Virtualization, 5G, the Internet of Things (IoT), high performance computing (HPC) and artificial intelligence.

The inventors believe that a reliable multicast technique with low intrinsic latency and the ability to scale is an important building block required to address the challenges posed by these time-sensitive applications. Furthermore, it could also play an important role in Byzantine Fault Tolerant protocols, which are becoming more appealing as users of data and applications are increasingly more susceptible to malicious behaviour.

However, even if we assume the switch fabric itself can be made lossless, the networking interface and protocol stack at each of the node's memory and central processing unit (CPU) still introduce packet drops. This can arise for many reasons, ranging from insufficient allocation of buffers to the processor's inability to keep up with the rate of packet arrival and transmission. Multicast traffic would only exacerbate these issues, as outlined below.

2.1 Packet Loss Challenges of Multicast and Proposed Scalable Solutions

Within a cluster of networking nodes, packets sent out from the sender's CPU go through the transmitting protocol stack layers, traverse the switch fabric, and finally move up the receiving protocol stack layers before it reaches the receiving side's CPU. Along this path, packets could be dropped due to reasons such as traffic congestion, insufficient allocation of buffers, or blocking in the switch fabric. This could happen at many points within the sender's stack, the switch fabric, as well as the receiver's layer-2, 3, and 4 (L2, L3, and L4) buffers.

Most switch fabrics (especially for Ethernet) are not designed to be lossless even for unicast traffic. In addition, the Ethernet/IP/TCP and UDP stacks were designed as best-effort and hence these cannot guarantee delivery of packets. However, to achieve a reliable multicast at line rate of 10 Gb/s and beyond, the loss ratio required is lower than one in a billion. Accordingly, the inventors have addressed this through a combination of an optical switch fabric and the RDMA stack.

2.1. A Tackling Packet Loss in the L1 Switch Fabric

Multicast communication transmits information from a single source to multiple destinations. Although it is a fundamental communication pattern in telecommunication networks as well as in scalable parallel and distributed computing systems, it is often difficult to implement efficiently using hardware at the physical layer (L1).

Figure 11:
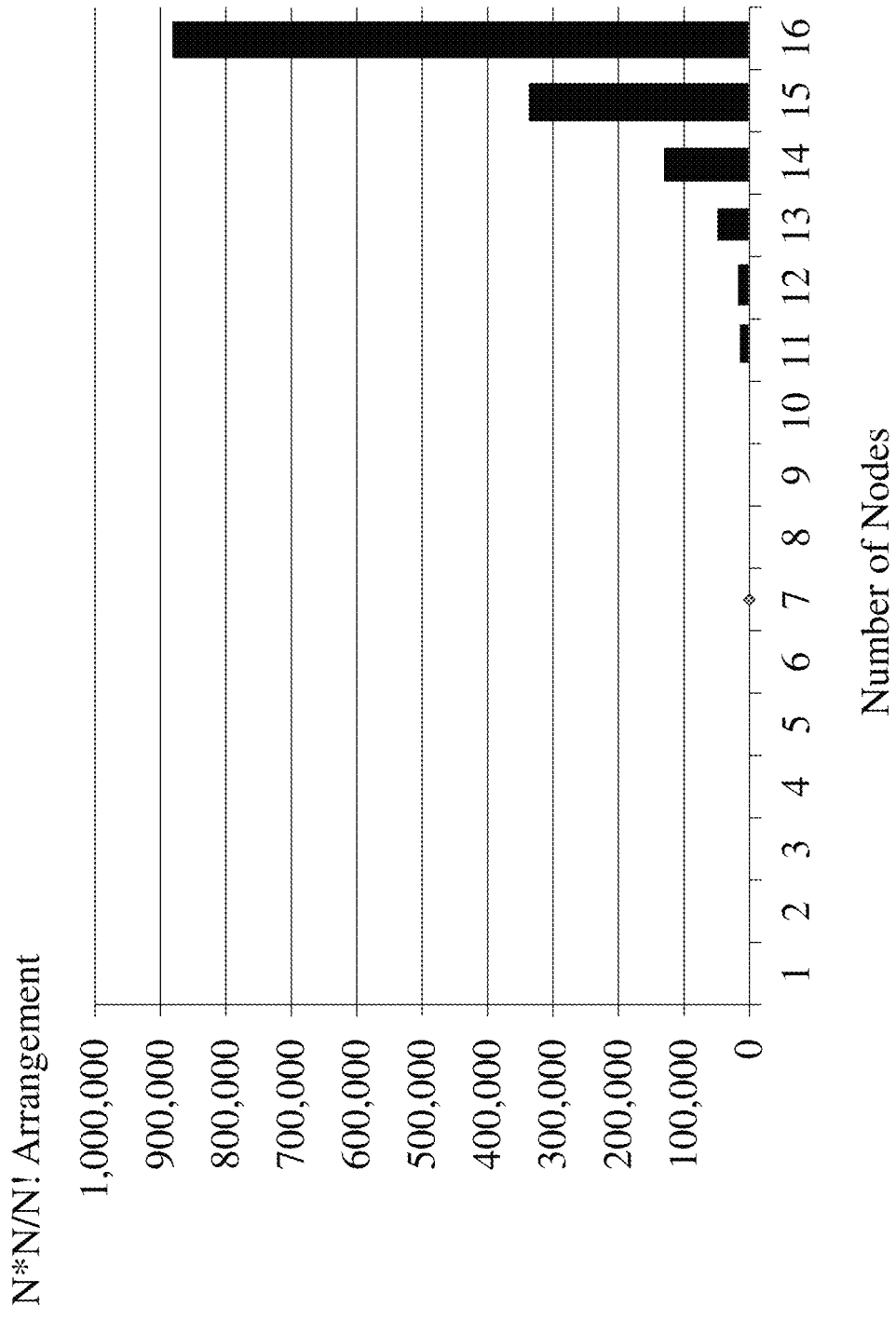
FIG. 11 depicts a graph of the ratio of N*N to N factorial as a function of the number of ports of a network, N.

Building large scale switch fabrics is challenging even for unicast (point-to-point) connections. Consider an N×N switch to represent the switch fabric and consider the permutations of connections needed among inputs and outputs. For a non-blocking switch (also called perfect switch), the number of permutation assignments (maximal set of concurrent one-to-one connections) needs to be N! (N factorial), with the number of cross points scaling as N^2 (N square). When N becomes large, this crossbar switch is difficult and expensive to scale, so the switch fabric is usually implemented in a multistage switching configuration using a Clos-switch or some variation thereof. FIG. 11 depicts a graph of the ratio of N*N to N factorial as a function of the number of ports of a network, N.

The interconnections between the internal switch stages further increase the number of potential congestion points that can lead to package drops. Furthermore, even though the full Clos configuration is strictly non-blocking for unicast traffic, oversubscription is often introduced in some of the switching stages for cost reasons, further increasing the probability for congestion and package loss within the switch fabric.

When used in a packet-switched context for point-to-point (unicast) traffic, a perfect switch will ensure that no packet is lost within the switch itself. Packets can still be lost outside the switch if there is congestion before or after the switch which can cause the ingress and egress buffers to overrun.

In the presence of multicast traffic, things get more challenging. In this case, the crossbar switch is no longer internally non-blocking, since the number of multicast assignments needed to support arbitrary multicast is N^N, which is significantly larger than N! (N factorial). Furthermore, multicast traffic can exacerbate congestion issues, especially at the switch egress buffers, since packets from many sources can be directed to the same destination output port (incast).

It is not difficult to see that the number of multicast assignments needed rapidly outgrow the number of available permutation assignments, even for a relatively small port count. For example, as seen in FIG. 11, even at N=16, we would need almost 900,000 times more assignments than what is available on the perfect switch.

This implies that performing multicast directly using existing switch hardware will quickly lead to blocking and loss of information, making low-loss-ratio multicast challenging, and practically impossible. It is therefore not surprising why multicast in today's distributed systems is often implemented using software as an overlay on top of the unicast switch hardware.

To overcome the aforementioned hardware limitation, the inventors have successfully implemented a key physical-layer (L1) building block device based on a passive optical cross connection network (PDXN) by using an N×N optical coupler fabric. Optical power from each input is divided equally among the N outputs so that no reconfiguration is needed to set up a circuit between an input and an output. Since this architecture supports multicast, it can also support unicast too. However, if used primarily for unicast traffic, this architecture could be expensive.

Figure 12:
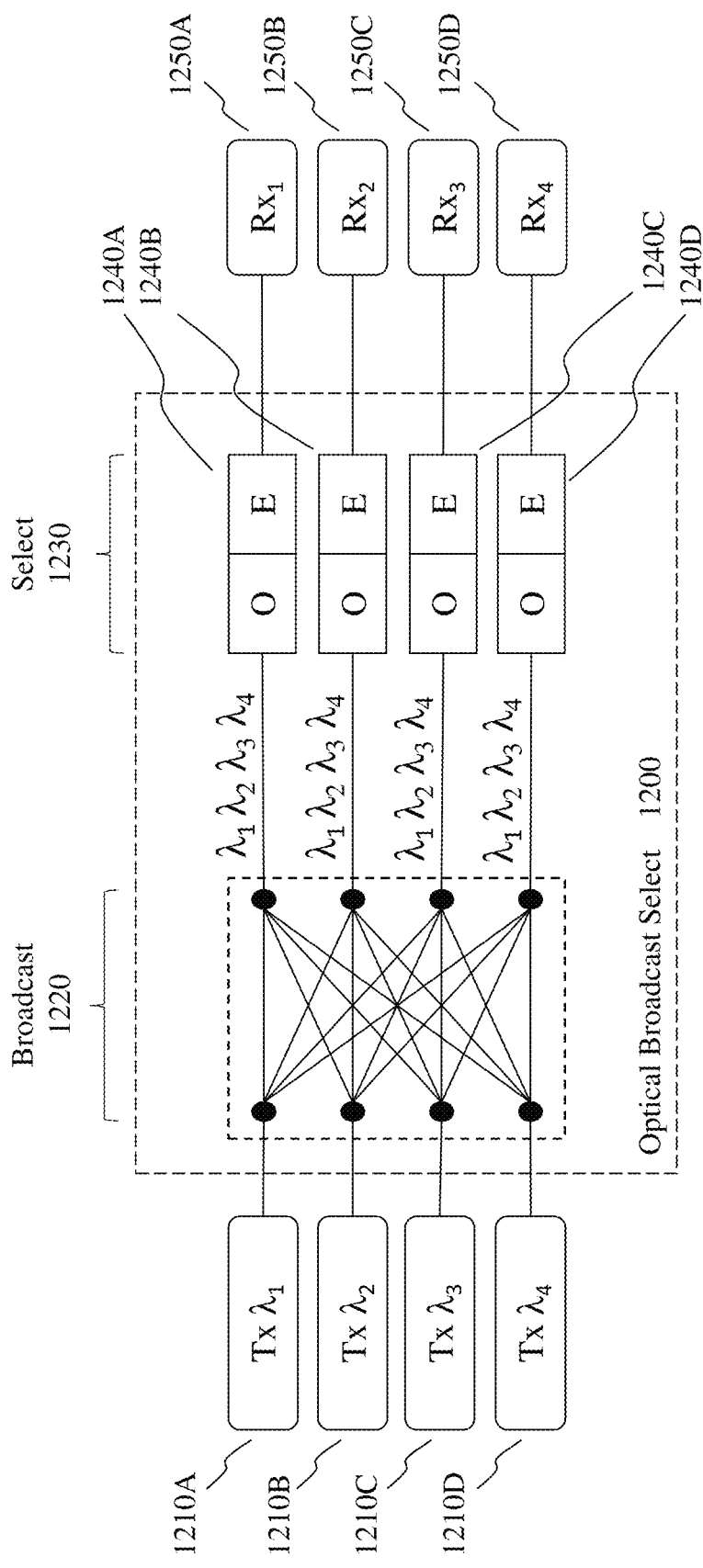
FIG. 12 depicts schematically an optical broadcast and select architecture supporting remote direct memory access over a passive optical cross-connect fabric enhanced with wavelength division multiplexing according to an embodiment of the invention.

Accordingly, referring to FIG. 12 there is depicted schematically what the inventors refer to as an Optical Distributed Broadcast-Select Switch supporting RDMA over a passive optical cross-connect fabric enhanced with wavelength division multiplexing according to an embodiment of the invention. Accordingly, within FIG. 12 only 4 channels are depicted for simplicity. On the left four transmitters 1210A to 1210D each transmit upon a different wavelength, λ1 to λ4, to a different input port of the Optical Broadcast Select 1200. A broadcast stage 1220, for example an optical star coupler, couples each input of the broadcast stage 1220 to each output of the broadcast stage 1220 such that each output now carries all 4 wavelengths, λ1 to λ4. Each output is coupled to a select stage 1230 comprising four opto-electronic stages 1240A to 1240D respectively, each of which is coupled to a receiver 1250A to 1250D.

The original PDXN design was combined with a Time Division Multiple Access (TDMA) Protocol. However, the PDXN architecture could also be used as an Optical Distributed Broadcast-Select Switch (ODBSS) as well when enhanced by WDM, as shown in FIG. 12. To do so, we assign each port a dedicated optical transmitter wavelength. At each destination port end, an optical demultiplexer followed by an array of photodetectors can be used to implement the receiver function. In this way, the PDXN fabric works in a distributed broadcast-and-select mode, with every port being able to broadcast to any port, and the receiving port can select the wavelength it would like to pick up.

Due to the wide and inexpensive bandwidth available in the optical fiber medium, this optical-based architecture can work in a distributed manner. Unlike the old-fashioned electronics-based design which has to complete the selection job within a centric switch chip, channel selection in an optical-based design can be delayed to the end-points, making it much easier to align with end-point subscription policies. This architecture has N^3 interconnections inside which can support N^N permutations.

Figure 13:
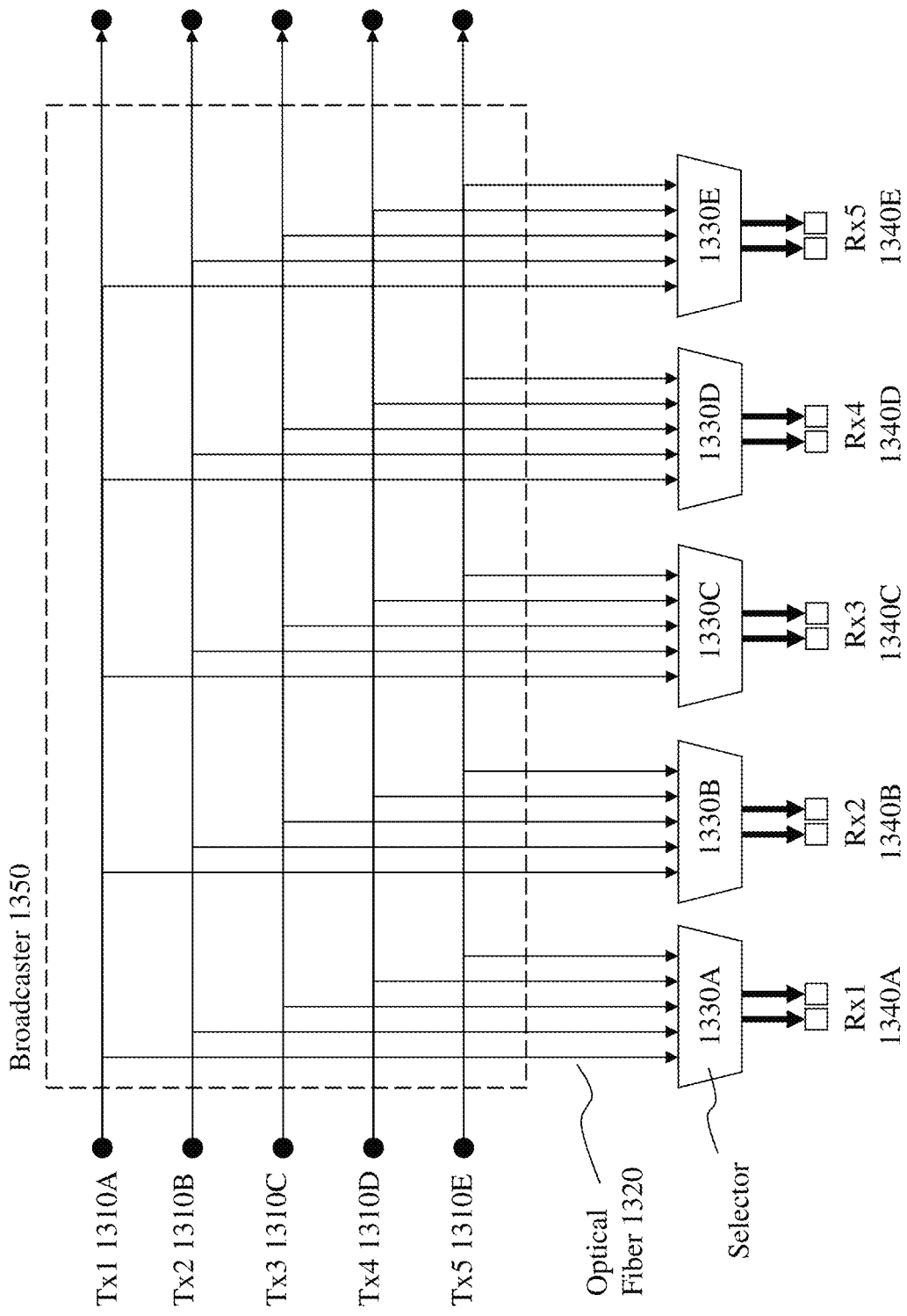
FIG. 13 depicts schematically a 1:N fan-out crossbar of an optically distributed broadcast select switch according to an embodiment of the invention.

One familiar with switch fabric architectures would notice the similarity between an ODBSS and a crossbar with fan-out. In fact, the ODBSS design could be considered as a crossbar with full 1:N fan-out which has N^N permutation as shown in FIG. 13. By being able to achieve a full fan-out, the ODBSS is capable to offer arbitrary multicast with NN permutations within. As depicted in FIG. 13 a set of transmitters Tx1 to Tx5 1310A to 1310E respectively form a series of optical busses which are "tapped" and coupled to a set of selectors 1330A to 1330E, respectively. These being implemented by optical fibers 1320 for example. Each selector couples to a receiver, first to fifth receivers 1340A to 1340E, respectively. The matrix of "taps" being referred to as a Broadcaster 1350.

In today's widely-deployed commercial optical modules, an 80 wavelength-channel system based on DWDM (Dense Wavelength Division Multiplexing) is already practical. Accordingly, these architectures can support up to 80 ports using the ODBSS fabric directly or with a larger port count optical amplifiers can be used within the fabric to compensate for the higher losses and maintain a suitable link budget. The inventors note that the maturity of the optical component and module industry have led to a dramatic cost reduction over the last two decades. Therefore, such device can be built out of cost-effective, off-the-shelf optical modules and components.

2.1. B Tackling Packet Loss in Receiving Buffers

Buffer misalignment in communication stacks is another major factor for failure to achieve low loss-ratio multicast. This can happen in different layers that refer to memory buffer allocation actions. To deliver the message to processes (CPU), a reliable receiving mechanism is required. In standard TCP/IP architecture, reliable delivery is guaranteed by layer 4 protocol TCP (Transmission Control Protocol). Despite its ability to ensure lossless delivery for unicast traffic, TCP cannot be used as an L4 protocol for multicast because as a connection-based protocol, TCP has no mechanism to handle one-to-many connections. On the other hand, with UDP, a multicast over IP (L3) is practical, but the delivery reliability is never guaranteed. Furthermore, due to the standard protocol stack implementation on the Linux platform, the kernel would allocate socket buffer for each ethernet frame received and copy payload from kernel space to user space applications after. This could amplify buffer mis-alignment problems and trigger a high loss rate in the upper layer protocols. When the inventors measured UDP loss over a good one-to-one physical connection, the loss-ratio obtained was as high as 20% initially. With careful fine tuning of the kernel buffer and traffic load, the loss ratio can be improved but is still often beyond one percent.

Ideally, a message-based L4 protocol with pre-allocated buffers for receiving messages and working in tandem with a lossless ODBSS architecture in L1 would be appropriate for a low-loss multicast system. Based on this understanding, the inventors explored RDMA (Remote Direct Memory Access), which is a protocol developed for high performance computing. In RDMA specifications, two datagram-based queue pair types, namely Reliable Datagram (RD) and Unreliable Datagram (UD), could potentially be used for multicast. However, among all the known RDMA implementations today, none of them supports Reliable Datagram and some of them do not support multicast at all. This is not surprising and is likely due to the lack of a powerful switch that can support low loss-ratio multicast.

InfiniBand, RDMA over Converged Ethernet (RoCE) and Internet Wide Area RDMA Protocol (iWARP) are the three major implementations of RDMA commonly used in industry. Among them the best-known implementation is Infini-Band. RoCE, which leverages the low-cost and ubiquitous IP/Ethernet ecosystem, is now being deployed in datacenters.

The inventors employ RDMA Datagram (UD) transport, which has a pre-allocated resource on both the sender and receiver sides. In their proof-of-concept work, the inventors experimented with RoCE hardware-based Network Interface Cards (NICs) from different vendors. Using these, we were able to achieve a multicast loss ratio level of the order of one per million in our lab, which was much better than what is possible with UDP. However, without access to the internal hardware/firmware, the inventors were not able to determine if this could be further improved. Therefore, the inventors turned to Soft-RoCE which is an open-source software implementation of RoCE. With some debugging and improvement of the software, we were able to get the multicast datagram feature to work successfully; in doing so, the inventors succeeded in sending over 68 billion multicast packages through our prototype PDXN fabric without any packet loss.

Using a Perftest package, the inventors performed message latency benchmarking tests using two different RoCE hardware NICs (Mellanox and Emulex), comparing the hardware RoCE performance with inventors own Soft-RoCE, hereinafter referred to as Viscore-improved Soft-RoCE, as well as the open-source Soft-RoCE. The inventors carried out latency testing using both RDMA Datagram and RDMA RC (Reliable Connection). Since the RDMA Datagram size is limited by the MTU (which is 4096 bytes), the inventors used RDMA RC to extend the testing to larger messages. The results of the Viscore-improved Soft-RoCE together with the OpenSource SoftRoCE and Hardware RoCE are presented in FIG. 14 for data packages from 2 bytes to 8,388,608 bytes. The inventors found that their implementation achieved better performance than open-source Soft-RoCE, by improving latency and throughput performance of Soft-RoCE by 2× and 3×, respectively.

2.1. C Scaling the Multicast in Multi Dimensions

Figure 15:
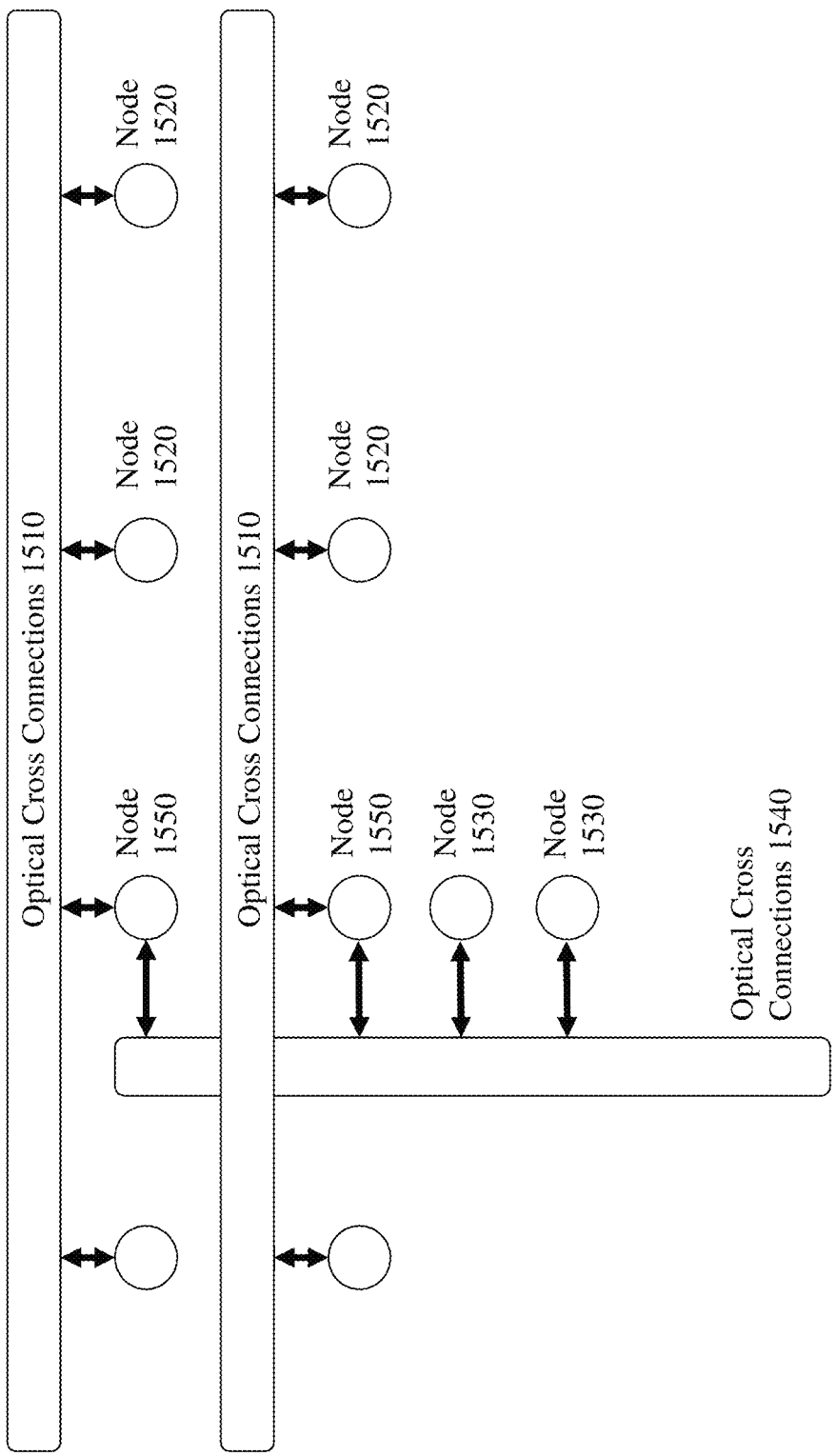
FIG. 15 depicts schematically a scale out into multi-dimensions employing optically distributed broadcast select switches.

For larger port counts, one can leverage a multi-dimensional approach, as shown in FIG. 15 or as depicted in FIGS. 8 and 9, to scale the network to ND ports, in which D is the number of dimensions, and N is the number of nodes within a dimension. When data packets move from one dimension to another, they go through an Optical-to-Electrical-to-Optical (OEO) conversion. This enables optical wavelengths to be re-used in different dimensions, facilitating the ability to scale. For example, a three-dimensional system based on 40 wavelengths can support up to 40×40×40=64K ports. Similarly, an 80-port ODBSS can potentially scale up to 512K ports. Within FIG. 15 a series of "horizontal" optical cross-connections 1510 are coupled to a series of first nodes 1520. A plurality of second nodes 1530 are connected to a "vertical" optical cross-connection 1540. A subset of the nodes, third nodes 1550 are connected to each of a ""horizontal" optical cross-connection 1510 and a "vertical" optical cross connection 1540. Within the architecture depicted in FIG. 15 each node, whether first node 1520, second node 1530 or third node 1550, is only It should be noted that, in the multi-dimension scaling method, the nodes in between dimensions are filtering the multicast packets to its sub-nodes. If over-subscription happens, then these nodes will be exposed to the risk of higher ratio packet loss. Therefore, when designing upper layer protocols, one should bear this in mind to carefully control the over-subscription policy.

Nevertheless, since the ODBSS works in a distributed manner, any over-subscription only affects the end-nodes, not the fabric in between, thus limiting the loss risk to within a subnet or the end-nodes alone. This is in contrast to a centric switch-based architecture, in which there is a well-known risk of broadcast storms that affect the entire network [11].

2.2 Low Latency and Low Loss Implementation 2.2. A. Implementation and Proof-of-Concept Test-Bed Setup The inventors built a proof-of-concept test-bed using four computer nodes connected together by a 12-port PDXN module. Standard commercial DWDM 10 Gb/s SFP+ transceivers and optical de-multiplexers were used to complete an ODBSS implementation for the four nodes. With this setup, the inventors then tested RDMA UD multicast over IP/Ethernet multicast addressing with several RoCE hardware implementations and software RoCE implementations.

The inventors note that this experimental setup actually provided several unique advantages when it comes to being able to push the loss ratio as low as possible. First of all, if one has already reached a loss ratio that is lower than one in a million using a setup involving an electronic switch, it would be hard to determine if the loss were happening in the switch or in the NIC itself. With the inventors ODBSS architecture, they are confident that if a packet is lost, it could only happen in the transmitting or receiving ports, or the buffers which are aligned with them. Since we have more than one receiving port, if the transmitting side loses the packet, all receiving sides should lose that packet. This rather simple feature is of great help in de-bugging and identifying the root cause of packet loss.

Second, using a software RoCE implementation actually enabled the inventors to debug more effectively for several reasons:
  the implementation is more transparent to as we have access to the source code;
  packets and messages can be tagged as needed for de-bugging purposes; and
  we can easily fix bugs when we identify them.

Figure 16:
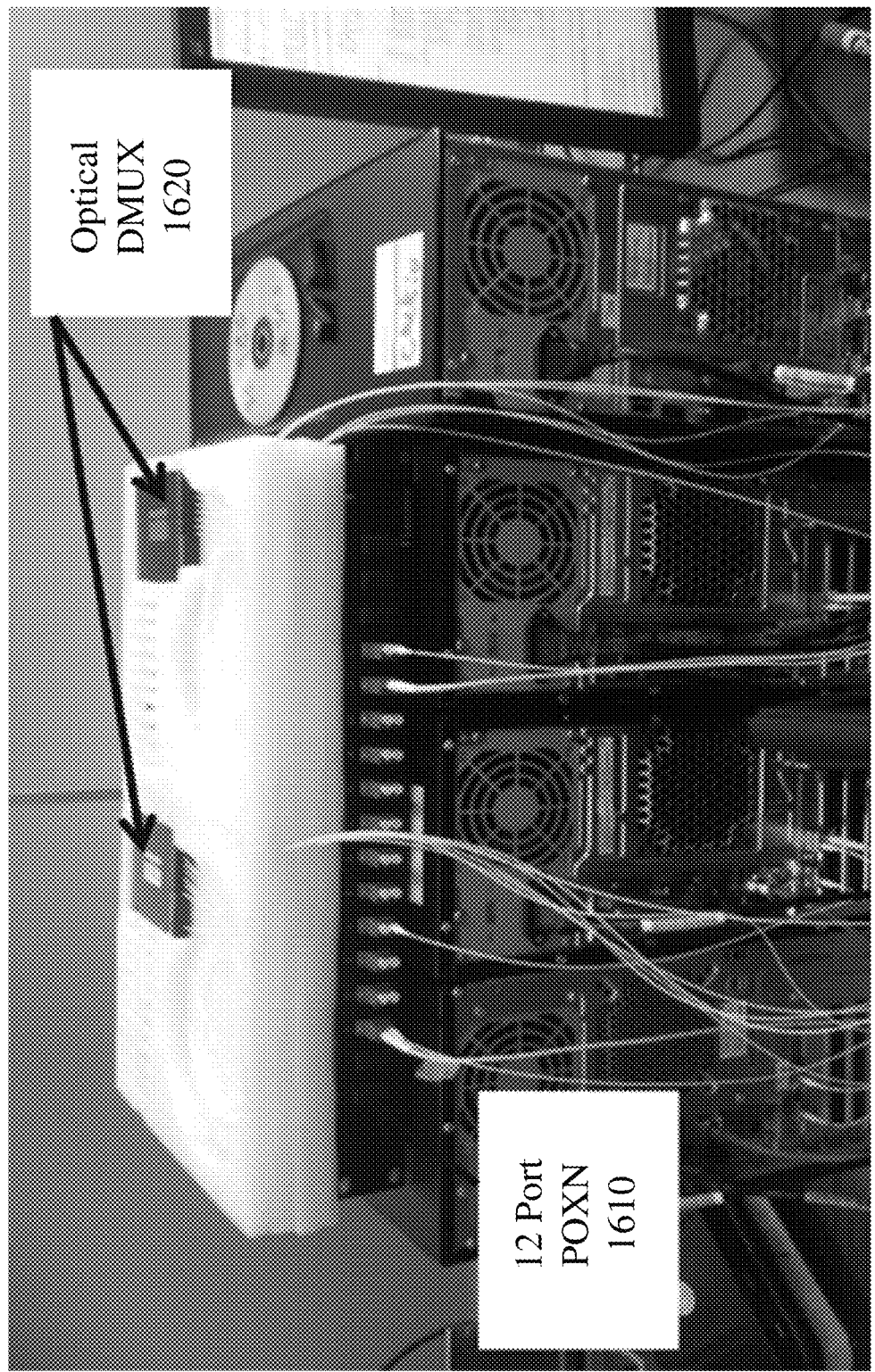
FIG. 16 depicts an optical micrograph of a proof-of-concept test bed employed in obtaining the results in FIG. 14.

The inventors started testing with hardware RoCE implementations, but when they encountered packet loss, they could not make further progress until they switched to a software implementation. The packet loss observed with the hardware RoCE NICs does not necessarily imply that there are bugs in the hardware implementation itself, but rather that the inventors could not pursue its root cause given the proprietary nature of the hardware implementation. The proof-of-concept test bed is depicted in FIG. 16 wherein the 12 port PDXN 1610 is identified as are the optical DMUX 1620.

After the inventors pushed the loss ratio to less than one in a hundred million, 1 in $10^8$, some unexpected bugs started to show up that could only be identified and fixed in the test-bed described above. For instance, after such a large number of packets are continuously sent out, the PSN number can become larger than its range and needs to be reset. Although this procedure is well defined and documented, it turned out that the related algorithm in the Soft-RoCE C code was not completed to cover this rare case, which does not happen often unless a very large number of UD packets is sent. It is unknown if hardware implementations cover such rare cases with very large number of UD packets.

Last but not least, the practical know-how of building passive optical cross-connects with inexpensive optical components made this implementation economically feasible. It is also evident that the interdisciplinary nature of the work lead to the improvements in the low loss performance of RoCE where the optical hardware played a key role in improving the low-loss performance of RoCE, which in turn leads to achieving the multicast potential of this optical hardware.

2.2. B Low Latency and Low Loss Ratio

Figure 17:
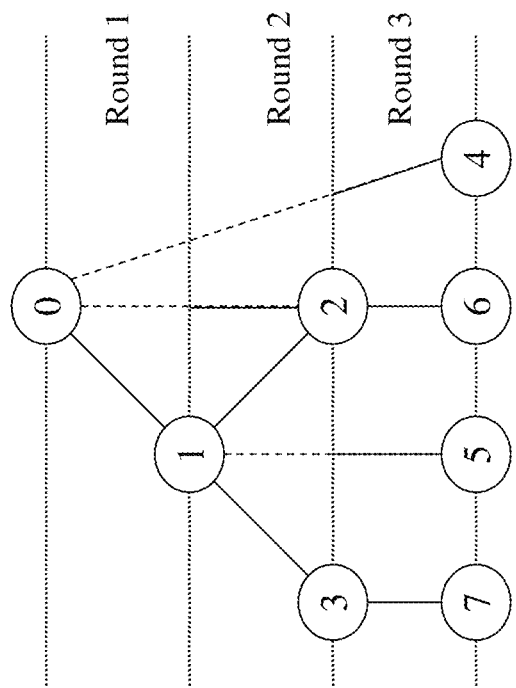
FIG. 17 depicts a classical binomial multicast according to the prior art.

It is instructive to do a quick comparison of the achievable latency performance with ODBSS+RDMA multicast versus that of overlay multicast and other hardware (i.e. switch-based) multicast. A good example of a high-performance overlay multicast is based on Binomial tree implementation where a classic binomial multicast tree is depicted in FIG. 17.

The overlay binomial multicast latency can be thought of as being given by Equation (1) below where L is the unicast latency, N is the node count, and K is a weighting factor which is dependent on how long each node has to wait to complete its task (and can therefore increase nonlinearly with N).

$$\text{Latency} = (K \cdot (\log_2(N)) \cdot L \quad (1)$$

At first glance, the latency of binomial overlay multicast does not grow that fast with the node count because the binomial algorithm builds chains with length of $\log_2(N)$. However, measurements show that latency of binomial multicast actually grows nonlinearly with node count. This is due to two factors in the overlay implementation. The first is related to the long tail in unicast latency being much larger (35 μs versus 3 μs) than that of the average latency. The second is related to nodes on the chain needing to wait for the previous one to send them a packet before they can send. Therefore, the latency of chain(s) in the binomial tree is vulnerable to the statistical nature of traffic in a network. These statistical fluctuations only worsen with extra traffic burden introduced by the binomial algorithm.

Hardware (i.e. switch-based) multicast, e.g. IP multicast or InfiniBand multicast, in principle, should have better latency than overlay multicast. For example, the latency of hardware-multicast based algorithms has been shown in the prior art to out-perform that of binomial overlay multicast. However, InfiniBand multicast (as well as IP multicast) is lossy, which limits its potential use.

Unlike InfiniBand hardware multicast, the loss ratio of RDMA multicast over ODBSS is very low. In the inventor's test-bed demonstration the loss ratio has been pushed to as low as one in 68 billion packets. With ODBSS, if we stay within one dimension, the multicast latency is comparable to the unicast latency. When scaling using multi-dimensions, the increase in multicast latency is weighted by the number of dimensions, rather than by N (the number of nodes). As N increases, the multicast latency advantage grows nonlinearly when compared to overlay multicast latency.

It is worthwhile to note that incast and the over-subscription management is always a challenge for all multicast architectures. However, the proposed ODBSS architecture has advantages for incast traffic because the selection happens at the end point. Even if one node is over-subscribed, it only affects that one particular node, but neither the ODBSS fabric, the sender, nor the other receiving nodes are impacted.

2.2. C Enabling Low Latency Reliable Multicast

The low-latency low-loss-ratio optical multicast described as the potential to become an important toolset for protocol designers who need a low-latency reliable multicast to implement consistency protocols. Given the very low loss ratio observed by the inventors for optical multicast, they believe it is practical to build a simple NACK-based reliable multicast transport over ODBSS and RDMA Datagram.

As an example, Byzantine fault tolerance consistency protocols are built using reliable multicast, so it is conceivable that such protocols could potentially benefit from an intrinsically low-latency reliable multicast. A low latency consistency protocol could shorten the time window available for traitorous processes to attack by enabling a distributed system to achieve consistency faster. Furthermore, traitorous processes would have their own consistency challenge if they need to collaborate among themselves using a secret communication channel, especially if their channel lacks this low latency advantage.

2.3 Comments

The architectures presented by the inventors provide for a scalable low-latency, low loss-ratio transport-layer multicast solution by combining the benefits of an optical cross-connect fabric (ODBSS) with RDMA. This combination in turn simplifies low-latency reliable multicast implementation.

The inventors in comparing their implementation with the prior art have identified instance of employing optical couplers to build optical switch fabrics or demonstrate multicasting. Within the prior art Ni et al. in "PDXN: A New Passive Optical Cross-Connection Network for Low Cost Power-Efficient Datacenters" (J. Lightwave Technology, 32(8), pp. 1482-1500) have employed optical couplers, such as 1×N and N×N couplers, to build an optical switch fabric through a TDMA implementation. In contrast, Samadi et al. in "Optical Multicast System for Data Center Networks" (Optics Express, 23(17), pp. 22162-22180) integrated 1×N passive optical splitters within a hybrid network architecture combining optical circuit switching with electronic packet switching to reduce the complexity of multicast traffic flows.

Further, Samadi et al. in "Experimental Demonstration of One-to-Many Virtual Machine Migration by Reliable Optical Multicast" (25th European Conference on Optical Communication (ECOC); DOI:10.1109/ECOC.2015.7342006) an optical circuit switching network directs multicast traffic to a 1×N optical splitter whilst a separate electronic packet switching network is employed for NACK control.

It would be evident that in contrast to the prior art no electronic packet switch network as required by Samadi et al. Similarly, Ni et al. is silent to wavelength division multiplexing nor an ODBSS architecture. Further, the architecture proposed by the inventors due to the very low loss ratio achievable allow simplified NACK control and reduced latency.

Embodiments of the invention as described above exploit a new optical architecture in conjunction with RDMA to offer an intrinsically low-latency and low loss-ratio multicast channel. Building upon this, a reliable multicast protocol is proposed to deliver a reliable, low-latency, and scalable multicast service to distributed systems. By offloading multicast traffic, these reliable low-latency multicast service also improve the unicast performance of existing switch fabrics. Within a subnet, this optical hardware offers intrinsic ordering in the physical layer. Also, RDMA maintains ordering within a message.

The inventors also note that these embodiments of the invention, through their low-latency reliable multicast, can be employed in other applications such as fast data replication services, including publish/subscribe (Pub/Sub) services and distributed lock services, especially in use cases with fast Non-Volatile Memory Express Over Fabric (NVMeOF) storage. Additionally, as mentioned above, Reliable Datagram (RD) is currently not supported by the RDMA implementations we have tested, primarily because of the N^N to N! issue alluded to earlier. This makes it extremely hard to perform non-blocking broadcast in modern electrical packet switching systems. However, the proposed ODBSS overcomes this obstacle allowing its use in implementing a Reliable Datagram over the ODBSS architecture.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing, or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one or more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of routing data comprising:
 using a network which routes the data; wherein
 using the network comprises:
  using a switch group comprising:
   using a plurality of M first switches, each first switch for coupling to a plurality of electronic devices; and
   using a second switch coupled to the plurality of M first switches;
  interconnecting the second switch to the plurality of M first switches with a plurality of first optical links; and
  using within a predetermined first optical link of the plurality of first optical links a first optical splitter providing a plurality of first outputs, wherein
   a first output of the plurality of first outputs forms part of the predetermined first optical link of the plurality of first optical links and
   each remaining first output of the plurality of first outputs is coupled to predetermined first switches of the plurality of first switches; and
 using the network further comprises either:
  using a first portion comprising:
   using a plurality of N switch groups of which the switch group is one of the plurality of N switch groups;
   using a third switch coupled to the plurality of N switch groups;
   interconnecting the third switch to the plurality of M first switches within each switch group of the plurality of N switch groups with a plurality of second optical links; and
   using within a predetermined second optical link of the plurality of second optical links a second optical splitter providing a plurality of second outputs; wherein
    a second output of the plurality of outputs forms part of the predetermined second optical link of the plurality of second optical links; and
    each remaining second output of the plurality of second outputs is coupled to the second switch within a predetermined switch group of the plurality of N switch groups;
  or using a second portion comprising:
   using a plurality of N switch groups of which the switch group is one of the plurality of N switch groups;
   using a third switch coupled to the plurality of N switch groups;
   interconnecting the third switch to the plurality of M first switches within each switch group of the plurality of N switch groups with a plurality of second optical links; and
   using within a predetermined second optical link of the plurality of second optical links a second optical splitter providing a plurality of second outputs; wherein
    a second output of the plurality of outputs forms part of the predetermined second optical link of the plurality of second optical links; and
    each remaining second output of the plurality of second outputs is coupled to the second switch within a predetermined switch group of either N−1 switch groups of the plurality of N switch groups or N switch groups of the plurality of N switch groups.

2. The method according to claim 1, wherein
at least one of:
 the predetermined first optical link is an outer link when the plurality of M first switches and the second switch are viewed as a tree structure;
 the first optical splitter is coupled to either the plurality of M first switches or to a plurality of M−1 first switches.

3. The method according to claim 1, wherein
each first switch of the plurality of M first switches comprises a plurality of first ports and a second port where each electronic device of the plurality of electronic devices associated with the first switch of the plurality of M first switches comprises a transmit port coupled to a predetermined first port of the plurality of first ports of the first switch of the plurality of M first switches and a receive port coupled to another predetermined first port of the first switch of the plurality of M first switches; wherein the second port of the first switch is coupled to the first optical switch comprising a plurality of output ports, each output port of the plurality of output ports coupled to a predetermined electronic device of the plurality of electronic devices.

4. The method according to claim 3, wherein
the network has one of a first configuration, a second configuration and a third configuration;
in the first configuration each output port of the plurality of output ports is coupled to another receive port of a predetermined electronic device of the plurality of electronic devices;
in the second configuration each output port of the plurality of output ports is coupled to a receive port of a predetermined electronic device of the plurality of electronic devices and communications between the predetermined electronic device of the plurality of electronic devices and its associated first switch of the plurality of M first switches are routed via either the second port of the first switch of the plurality of M first switches and the predetermined first port of the plurality of first ports coupled to the predetermined electronic device of the plurality of electronic devices at any instant; and
in the third configuration each output port of the plurality of output ports is coupled to another receive port of a predetermined electronic device of the plurality of electronic devices and is wavelength division multiplexed onto the same optical link between the first switch and the predetermined electronic device of the plurality of electronic devices coupling the receive port of the predetermined electronic device of the plurality of electronic devices to the first switch.

5. A network comprising:
a switch fabric comprising:
  a plurality of M first switches, each first switch for coupling to a plurality of electronic devices; and
  a second switch coupled to the plurality of M first switches;
  a plurality of first optical links interconnecting the second switch to the plurality of M first switches; and
  a first optical splitter providing a plurality of first outputs within a predetermined first optical link of the plurality of first optical links; wherein
  a first output of the plurality of first outputs forms part of the predetermined first optical link of the plurality of first optical links; and
  each remaining first output of the plurality of first outputs is coupled to predetermined first switches of the plurality of first switches; and
either a first additional switch fabric or a second additional switch fabric; wherein the first additional switch fabric comprises:
  a plurality of N switch groups of which the switch group is one of the plurality of N switch groups;
  a third switch coupled to the plurality of N switch groups;
  a plurality of second optical links interconnecting the third switch to the plurality of M first switches within each switch group of the plurality of N switch groups with; and
  a second optical splitter providing a plurality of second outputs within a predetermined second optical link of the plurality of second optical links; wherein
  a second output of the plurality of outputs forms part of the predetermined second optical link of the plurality of second optical links; and
  each remaining second output of the plurality of second outputs is coupled to the second switch within a predetermined switch group of the plurality of N switch groups;
the second additional switch fabric comprises:
  a plurality of N switch groups of which the switch group is one of the plurality of N switch groups;
  a third switch coupled to the plurality of N switch groups;
  a plurality of second optical links interconnecting the third switch to the plurality of M first switches within each switch group of the plurality of N switch groups; and
  a second optical splitter providing a plurality of second outputs within a predetermined second optical link of the plurality of second optical links; wherein
  a second output of the plurality of outputs forms part of the predetermined second optical link of the plurality of second optical links; and
  each remaining second output of the plurality of second outputs is coupled to the second switch within a predetermined switch group of either N−1 switch groups of the plurality of N switch groups or N switch groups of the plurality of N switch groups.

6. The network according to claim 5, wherein
at least one of:
  the predetermined first optical link is an outer link when the plurality of first switches and the second switch are viewed as a tree structure; and
  the first optical splitter is coupled to either the plurality of first switches or to a plurality of first switches.

7. The network according to claim 5, wherein
each first switch comprises a plurality of first ports and a second port, each electronic device of the plurality of electronic devices comprising a transmit port coupled to a predetermined first port of the plurality of first ports of the first switch and a receive port coupled to another predetermined first port of the first switch; wherein
the second port of the first switch is coupled to the first optical splitter comprising a plurality of output ports, each output port of the plurality of output ports coupled to a predetermined electronic device of the plurality of electronic devices.

8. The network according to claim 7, wherein
the network has one of a first configuration, a second configuration and a third configuration;
in the first configuration each output port of the plurality of output ports is coupled to another receive port of a predetermined electronic device of the plurality of electronic devices;
in the second configuration each output port of the plurality of output ports is coupled to a receive port of a predetermined electronic device of the plurality of electronic devices and communications between the predetermined electronic device of the plurality of electronic devices and its associated first switch of the plurality of M first switches are routed via either the second port of the first switch of the plurality of M first switches and the predetermined first port of the plurality of first ports coupled to the predetermined electronic device of the plurality of electronic devices at any instant; and in the third configuration each output port of the plurality of output ports is coupled to another receive port of a predetermined electronic device of the plurality of electronic devices and is wavelength division multiplexed onto the same optical link between the first switch and the predetermined electronic device of the plurality of electronic devices coupling the receive port of the predetermined electronic device of the plurality of electronic devices to the first switch.

\* \* \* \* \*